US012574864B2

(12) United States Patent
Chen

(10) Patent No.: US 12,574,864 B2
(45) Date of Patent: Mar. 10, 2026

(54) V2X COMMUNICATION METHOD AND APPARATUS

(71) Applicant: HUAWEI TECHNOLOGIES CO., LTD., Guangdong (CN)

(72) Inventor: Xiaoguang Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 597 days.

(21) Appl. No.: 17/956,915

(22) Filed: Sep. 30, 2022

(65) Prior Publication Data

US 2023/0027290 A1      Jan. 26, 2023

Related U.S. Application Data

(63) Continuation of application No. PCT/CN2021/072587, filed on Jan. 19, 2021.

(30) Foreign Application Priority Data

Apr. 1, 2020   (CN) .......................... 202010251658.5

(51) Int. Cl.
*H04W 52/36*          (2009.01)
*H04W 52/14*          (2009.01)
(Continued)

(52) U.S. Cl.
CPC ......... *H04W 52/367* (2013.01); *H04W 52/14* (2013.01); *H04W 52/285* (2013.01); *H04W 92/18* (2013.01)

(58) Field of Classification Search
None
See application file for complete search history.

(56) References Cited

U.S. PATENT DOCUMENTS 10,455,513 B2      10/2019   Wang et al.
2016/0037381 A1    2/2016    Jung et al.
(Continued)

FOREIGN PATENT DOCUMENTS

CN          101621316 A        1/2010
CN          103491617 A        1/2014
(Continued)

OTHER PUBLICATIONS

InterDigital Inc., "Text Proposal to 38.885 on Resource Pool Aspects for NR V2X", 3GPP RAN WG2 Meeting #105 R2-1901576, Athens, Greece, Feb. 25-Mar. 1, 2019, total 4 pages.
(Continued)

*Primary Examiner* — Jenkey Van

(57) ABSTRACT

The technology of this application relates to a V2X communication method and an apparatus. The method includes a first network element obtains UE density information of a first area in which target UE is located, and the first network element sends first information to the target UE based on the UE density information, where the first information is used by the target UE to adjust transmit power of a PC5 interface. The method provided in this application can improve V2X communication quality, and further reduce power consumption of UE. In addition, it can also be avoided that primary responsibility of an accident is transferred to a server, and information received by the UE is determined using global information, so that an error can be reduced.

18 Claims, 12 Drawing Sheets

(51) Int. Cl.
  *H04W 52/28*    (2009.01)
  *H04W 92/18*    (2009.01)

(56)            References Cited

U.S. PATENT DOCUMENTS

| | | | | |
|---|---|---|---|---|
| 2018/0220373 | A1 | 8/2018 | Arzelier et al. | |
| 2018/0220383 | A1* | 8/2018 | Kahtava | H04W 8/005 |
| 2018/0242115 | A1 | 8/2018 | Kim et al. | |
| 2018/0242190 | A1* | 8/2018 | Khoryaev | H04W 4/40 |
| 2020/0022089 | A1 | 1/2020 | Guo | |
| 2021/0219916 | A1* | 7/2021 | Yamada | A61B 10/00 |

FOREIGN PATENT DOCUMENTS

| | | | | |
|---|---|---|---|---|
| CN | 104144193 | A | | 11/2014 |
| CN | 105517054 | A | * | 4/2016 |
| CN | 103718624 | B | | 4/2017 |
| CN | 107040865 | A | | 8/2017 |
| CN | 107749193 | A | | 3/2018 |
| CN | 105766033 | B | | 4/2019 |
| WO | 2017032490 | A1 | | 3/2017 |
| WO | WO-20180279930 | A1 | * | 7/2018 ............ H04W 16/14 |

OTHER PUBLICATIONS

European Search Report for EP Application No. 21782193.3 dated Jun. 15, 2023, 13 pages.

Nokia et al., "Definition of Range", 3GPP TSG-SA WG2 Meeting #134 S2-1907265, Jun. 24-28, 2019, Sapporo, Japan, total 4 pages.

Kickss, "5G/NR LTE study notes: open-loop power control and closed-loop power control", CSDN Blog, Jul. 10, 2018, with an English machine translation, total 6 pages.

Samsung ,"Power control enhancements in V2V communication", 3GPP TSG RAN WG1 #84 R1-160578, St Julian s, Malta, Feb. 15-19, 2016, total 2 pages.

Laurent Gallo et al., "Resource Allocation for LTE-Direct Broadcast of Periodic Vehicular Safety Messages", EURECOM, Department of Mobile Communications, Campus SophiaTech, Oct. 13, 2013, total 26 pages.

3GPP TS 22.185 V15.0.0 (Jun. 2018); 3rd Generation Partnership Project; Technical Specification Group Services and System Aspects; Service requirements for V2X services; Stage 1(Release 15); total 14 pages.

3GPP TS 22.186 V16.2.0 (Jun. 2019)3rd Generation Partnership Project; Technical Specification Group Services and System Aspects; Enhancement of 3GPP support for V2X scenarios;Stage 1(Release 16), total 18 pages.

3GPP TS 23.285 V16.2.0 (Dec. 2019)3rd Generation Partnership Project;Technical Specification Group Services and System Aspects;Architecture enhancements for V2X services(Release 16), total 38 pages.

3GPP, "Application layer support for Vehicle-to-Everything (V2X) services, Functional architecture and information flows", 3GPP TS 23.286 V16.3.0, Mar. 30, 2020, total 64 pages.

3GPP TS 23.287 V16.2.0 (Mar. 2020), 3rd Generation Partnership Project; Technical Specification Group Services and System Aspects; Architecture enhancements for 5G System (5GS) to support Vehicle-to-Everything (V2X) services (Release 16), 53 pages.

3GPP TS 23.303 V15.1.0 (Jun. 2018), 3rd Generation Partnership Project; Technical Specification Group Services and System Aspects; Proximity-based services (ProSe); Stage 2(Release 15), 130 pages.

3GPP TS 23.502 V16.4.0 (Mar. 2020), 3rd Generation Partnership Project; Technical Specification Group Services and System Aspects; Procedures for the 5G System (5GS); Stage 2(Release 16), 582 pages.

3GPP TS 24.333 V16.0.0 (Sep. 2019)3rd Generation Partnership Project; Technical Specification Group Core Network and Terminals; Proximity-services (ProSe) Management Objects (MO)(Release 16), total 124 pages.

3GPP TS 24.385 V16.0.0 (Sep. 2019)3rd Generation Partnership Project; Technical Specification Group Core Network and Terminals; V2X services Management Object (MO)(Release 16), total 85 pages.

3GPP TS 36.213 V16.0.0:3rd Generation Partnership Project; Technical Specification Group Radio Access Network; Evolved Universal Terrestrial Radio Access (E-UTRA); Physical layer procedures(Release 16) Dec. 2019 total 568 pages.

3GPP TS 36.331 V15.9.0 (Mar. 2020)3rd Generation Partnership Project; Technical Specification Group Radio Access Network;Evolved Universal Terrestrial Radio Access (E-UTRA); Radio Resource Control (RRC); Protocol specification (Release 15), total 964 pages.

3GPP TS 38.213 V16.0.0 (Dec. 2019), 3rd Generation Partnership Project; Technical Specification Group Radio Access Network; NR; Physical layer procedures for control(Release 16), 146 pages.

Office Action for Chinese Application No. 202010251658 dated Nov. 29, 2022, 12 pages.

PCT International Search Report for Application No. PCT/CN2021/072587 dated Jan. 19, 2021, 9 pages.

3GPP TS 23.502 V16.4.0 (Mar. 2020)3rd Generation Partnership Project; Technical Specification Group Services and System Aspects; Procedures for the 5G System (5GS); Stage 2 (Release 16), total 309 pages.

Notice of Reasons for Rejection for JP Application No. 2022-560135 dated Aug. 21, 2023, 13 pages.

* cited by examiner

V2X COMMUNICATION METHOD AND APPARATUS

CROSS-REFERENCE TO RELATED APPLICATIONS

This application is a continuation of International Application No. PCT/CN2021/072587, filed on Jan. 19, 2021, which claims priority to Chinese Patent Application No. 202010251658.5, filed on Apr. 1, 2020. The disclosures of the aforementioned applications are hereby incorporated by reference in their entireties.

TECHNICAL FIELD

This application relates to the communications field, and in particular, to a V2X communication method and an apparatus.

BACKGROUND

Currently, internet of vehicles technologies have gradually become a hot spot in development of new automobile technologies. A sending frequency basis of a vehicle to everything (V2X) message defined in the 3rd generation partnership project (3GPP) can support 10 Hz, and can support a maximum of 50 Hz. Calculation is performed based on an existing frequency, and when there is a large quantity of UEs, a V2X server sends a large volume of data. Resources are limited when the data is transmitted through a proximity (neighborhood or short-distance) communication 5 (PC5) interface and a user equipment-universal mobile telecommunications system terrestrial radio access network (UE-UTRAN, Uu) interface. In this case, a large latency and a large packet loss exist when the V2X server sends the data. As a result, communication performance deteriorates.

Therefore, how to improve V2X communication quality is a problem that needs to be resolved.

SUMMARY

This application provides a V2X communication method and an apparatus, to improve V2X communication quality and further reduce power consumption of UE. In addition, it can also be avoided that primary responsibility of an accident is transferred to a server, and information received by the UE is determined using global information, so that an error can be reduced.

According to a first aspect, a V2X communication method is provided. The method includes: A first network element obtains UE density information of a first area in which target UE is located; and the first network element sends first information to the target UE based on the UE density information, where the first information is used by the target UE to adjust transmit power of a PC5 interface. According to the foregoing technical solution, the first network element may determine, based on the UE density information of the first area in which the target UE is located, the first information used by the target UE to adjust the transmit power of the PC5 interface. In other words, a network side may dynamically adjust the transmit power of the PC5 interface of the target UE based on the UE density information around the target UE. This can improve V2X communication quality of the target UE, and further reduce power consumption of the target UE. In addition, because the first network element sends, to the target UE, the first information determined based on the UE density information of the first area in which the target UE is located, and the first area is an area including the target UE as a center, instead of a risk area around the target UE. Therefore, it can be avoided that primary responsibility of an accident is transferred to a V2X server. Moreover, the first information sent by the first network element to the target UE is determined using global information, in other words, determined using the UE density information of the first area in which the target UE is located, so that an error can be reduced.

With reference to the first aspect, in an implementation of the first aspect, the first information includes target transmit power of the PC5 interface of the target UE.

According to the technical solution provided in this embodiment of this application, the first information includes the target transmit power of the PC5 interface of the target UE, so that the UE can adjust the transmit power of the PC5 interface based on the received target transmit power, to improve the V2X communication quality.

With reference to the first aspect, in another implementation of the first aspect, if the UE density information is a UE density value, and the UE density value is greater than or equal to a preset threshold, the first information includes first indication information, where the first indication information indicates the target UE to decrease the transmit power of the PC5 interface; or if the UE density information is a UE density value, and the UE density value is less than a preset threshold, the first information includes second indication information, where the second indication information indicates the target UE to increase the transmit power of the PC5 interface. The first information includes indication information, where the indication information may indicate the target UE to increase or decrease the transmit power of the PC5 interface, so that the UE can adjust the transmit power of the PC5 interface based on received transmit power, to improve the V2X communication quality.

With reference to the first aspect, in another implementation of the first aspect, the first network element is a V2X server, a policy control function PCF, or a V2X control function.

With reference to the first aspect, in still another implementation of the first aspect, when the first network element is the policy control function (PCF) or the V2X control function, that the first network element sends first information to the target UE based on the UE density information includes: The first network element determines first transmit power of the PC5 interface of the target UE based on the UE density information; the first network element receives third indication information from the V2X server, where the third indication information indicates second transmit power of the PC5 interface of the target UE; and the first network element sends the first information to the target UE based on the first transmit power and the second transmit power.

With reference to the first aspect, in yet another implementation of the first aspect, that a first network element obtains UE density information of a first area in which target UE is located includes: The first network element receives location information of at least one UE, where the at least one UE is located in the first area; and the first network element determines the UE density information based on the location information of the at least one UE. Because the UE density information is determined based on the location information of the at least one UE, in other words, the UE density information is determined using the global information, the error can be reduced.

With reference to the first aspect, in yet another implementation of the first aspect, that a first network element obtains UE density information of a first area in which target UE is located includes: The first network element receives fourth indication information from a roadside device, where the fourth indication information indicates a quantity of UEs detected by the roadside device, and the detected UE is located in the first area; and the first network element determines the UE density information based on the quantity of the UEs. Because the UE density information is determined based on the quantity of the UEs detected by the roadside device, in other words, the UE density information is determined using the global information, the error can be reduced.

According to a second aspect, a V2X communication method is provided. The method includes: determining a target sending range of a V2X message of first UE based on UE density information of a first area in which the first UE is located; and sending, based on the target sending range, the V2X message of the first UE to second UE in a second area in which the first UE is located, where an intersection exists between the second area and the target sending range. A V2X server controls a sending range of a Uu interface to further control a communication range of UE. This can reduce network resource load, to improve network performance With reference to the second aspect, in an implementation of the second aspect, when the UE density information is a UE density value, and the UE density value is greater than or equal to a preset threshold, the target sending range is a range obtained by decreasing a historical sending range by a preset margin; or when the UE density information is a UE density value, and the UE density value is less than a preset threshold, the target sending range is a range obtained by increasing a historical target sending range by a preset margin, where the historical target sending range is a previous target sending range determined based on the V2X message of the first UE.

With reference to the second aspect, in another implementation of the second aspect, the method further includes: receiving location information of at least one UE, where the at least one UE is located in the first area; and determining the UE density information based on the location information of the at least one UE. Because the UE density information is determined based on the location information of the at least one UE, in other words, the UE density information is determined using global information, an error can be reduced.

With reference to the second aspect, in still another implementation of the second aspect, the method further includes: receiving fourth indication information reported by a roadside device, where the fourth indication information indicates a quantity of UEs detected by the roadside device, and the detected UE is located in the first area; and determining the UE density information based on the quantity of the UEs. Because the UE density information is determined based on the quantity of the UEs detected by the roadside device, in other words, the UE density information is determined using the global information, the error can be reduced.

According to a third aspect, a vehicle to everything V2X communication method is provided. The method includes: user equipment UE receives first information, where the first information is for adjusting transmit power of a PC5 interface; and the UE adjusts the transmit power of the PC5 interface based on the first information. Transmit power of a PC5 interface of target UE is adjusted based on the received first information. This can improve V2X communication quality, and further reduce power consumption of the target UE. In addition, because the target UE receives the first information, where the first information is determined by a first network element based on UE density information of a first area in which the target UE is located, and the first area is an area including the target UE as a center, instead of a risk area around the target UE. Therefore, it can be avoided that primary responsibility of an accident is transferred to a server. Moreover, the first information received by the target UE is determined by the first network element using global information, in other words, determined by the first network element using the UE density information of the first area in which the target UE is located, so that an error can be reduced.

According to a fourth aspect, a V2X communication apparatus is provided. The apparatus includes: a processing module, configured to obtain UE density information of a first area in which target user equipment UE is located; and a communication module, configured to send first information to the target UE based on the UE density information, where the first information is used by the target UE to adjust transmit power of a proximity communication 5 PC5 interface.

According to a fifth aspect, a V2X communication apparatus is provided. The apparatus includes: a processing module, configured to determine a target sending range of a V2X message of first user equipment UE based on UE density information of a first area in which the first UE is located; and a communication module, configured to send, based on the target sending range, the V2X message of the first UE to second UE in a second area in which the first UE is located, where an intersection exists between the second area and the target sending range.

According to a sixth aspect, a V2X communication apparatus is provided. The apparatus includes: a communication module, configured to receive first information, where the first information is for adjusting transmit power of a proximity communication 5 PC5 interface; and a processing module, configured to adjust the transmit power of the PC5 interface based on the first information.

According to a seventh aspect, a communication device is provided. The communication device includes a processor and a memory. The memory is configured to store a computer program, and the processor is configured to invoke and run the computer program stored in the memory, to perform the method according to any one of the first aspect to the third aspect or the implementations of the first aspect to the third aspect.

According to an eighth aspect, a chip is provided. The chip is configured to implement the method according to any one of the first aspect or the second aspect or the implementations of the first aspect or the second aspect.

Specifically, the chip includes a processor, configured to invoke a computer program from a memory and run the computer program, so that a device on which the chip is installed performs the method according to any one of the first aspect or the second aspect or the implementations of the first aspect or the second aspect.

According to a ninth aspect, a chip is provided. The chip is configured to implement the method according to any one of the third aspect or the implementations of the third aspect.

Specifically, the chip includes a processor, configured to invoke a computer program from a memory and run the computer program, so that a device on which the chip is installed performs the method according to any one of the third aspect or the implementations of the third aspect.

According to a tenth aspect, a computer-readable storage medium is provided. The computer-readable storage medium is configured to store a computer program, where the computer program enables a computer to perform the method according to any one of the first aspect or the second aspect or the implementations of the first aspect or the second aspect.

According to an eleventh aspect, a computer-readable storage medium is provided. The computer-readable storage medium is configured to store a computer program, where the computer program enables a computer to perform the method according to any one of the third aspect or the implementations of the third aspect.

According to a twelfth aspect, a computer program product is provided. The computer program product includes computer program instructions, where the computer program instructions enable a computer to perform the method according to any one of the first aspect or the second aspect or the implementations of the first aspect or the second aspect.

According to a thirteenth aspect, a computer program product is provided. The computer program product includes computer program instructions, where the computer program instructions enable a computer to perform the method according to any one of the third aspect or the implementations of the third aspect.

According to a fourteenth aspect, a computer program is provided. When the computer program is run on a computer, the computer is enabled to perform the method according to any one of the first aspect or the second aspect or the implementations of the first aspect or the second aspect.

According to a fifteenth aspect, a computer program is provided. When the computer program is run on a computer, the computer is enabled to perform the method according to any one of the third aspect or the implementations of the third aspect.

DESCRIPTION OF EMBODIMENTS

The following describes technical solutions of this application with reference to accompanying drawings. The described embodiments are some but not all of embodiments of this application. All other embodiments obtained by a person of ordinary skill in the art based on embodiments of this application without creative efforts shall fall within the protection scope of this application.

The solutions in embodiments of this application may be applied to the Internet of Vehicles. To understand the solutions in this application more clearly, the following first briefly describes content related to the Internet of Vehicles.

Currently, internet of vehicles technologies have gradually become a hot spot in development of new automobile technologies. Domestic and abroad standards organizations actively participate in construction of the IoV technologies, for example, the 3GPP, the European Telecommunications Standards Institute (ETSI), and the System Architecture Evolution (SAE)/Institute of Electrical and Electronics Engineers (IEEE). China has also set up the Special Committee for Internet of Vehicles Industry of the Leading Group for the Construction of National Manufacturing Power.

Figure 1:
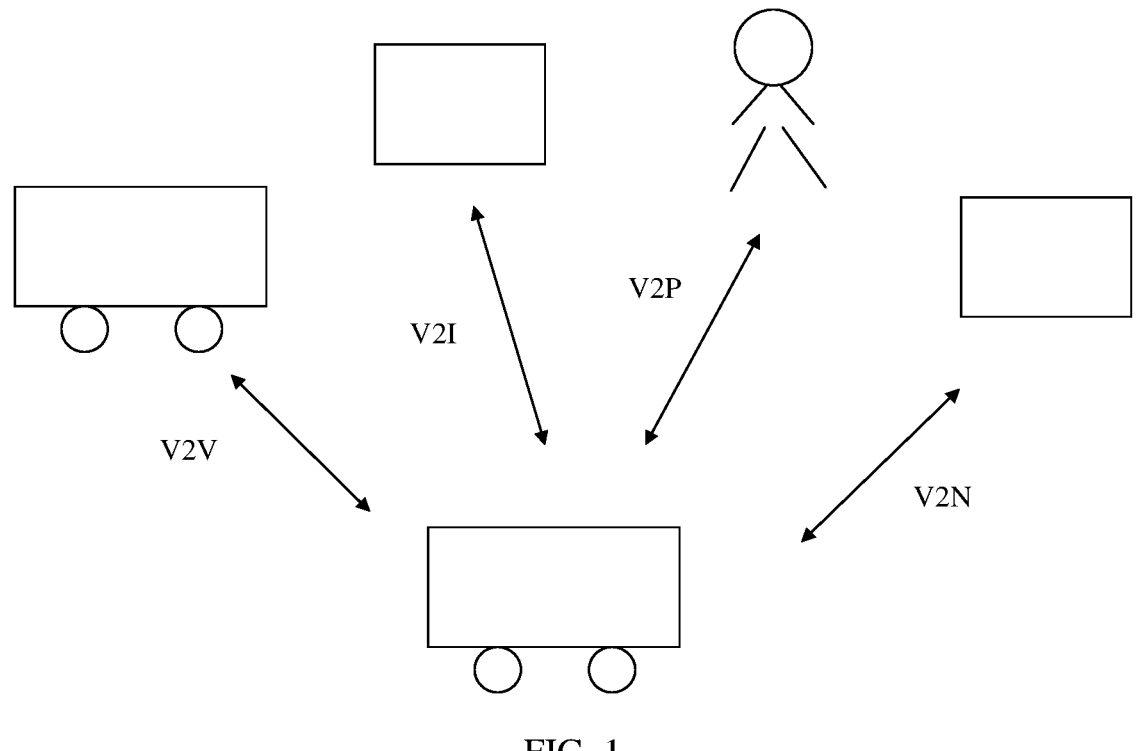
FIG. 1 is an example schematic diagram of an application scenario of a V2X technology.

As shown in FIG. 1, V2X technologies defined in the 3GPP may include the following four types: vehicle to vehicle (V2V), vehicle to infrastructure (V2I), vehicle to people (V2P), and vehicle to network (V2N).

The V2V indicates that direct communication may be performed between vehicles. The vehicle may be used as a mobile communication terminal, and may have a capability of receiving and sending basic vehicle body data.

The V2I indicates that a vehicle communicates with infrastructure around the vehicle, for example, may communicate with a traffic light at a crossroad or a roadside device.

The V2P indicates that a vehicle may also communicate with a person, and communication may be performed mainly by using a wearable device, a mobile phone, a computer, or the like on the person.

The V2N indicates that a vehicle communicates with an edge cloud. For example, for vehicles travelling in different directions at a crossroad, when there is a blind zone, an accident may occur if two vehicles do not slow down at the crossroad. If there is a building separating the two vehicles, the edge cloud may receive basic vehicle body data of the two vehicles through a roadside device, and then deliver an operation result to the vehicles through the roadside device, to warn drivers.

V2X defined in the 3GPP may support two types of communication: PC5 interface communication and Uu interface communication.

A PC5 interface may be a reference point between two user equipments (UEs), and may be configured to complete signaling and data transmission on a control plane and a user plane, proximity service discovery, direct communication, and a network access relay function for a terminal.

A Uu interface may be an interface between UE and an access network device. The access network device may be a base station in a universal mobile telecommunications system terrestrial radio access network (UMTS terrestrial radio access network, UTRAN), a base station in a universal mobile telecommunications system (UMTS), an evolved NodeB (eNodeB, or eNB) in a 4G network, a next generation NodeB (gNodeB or gNB) in a 5G network, or a base station in a subsequent evolved network. This is not limited.

In embodiments of this application, the PC5 interface may be used for short-distance direct communication or direct communication between UEs, which may be referred to as PC5 interface communication for short. The UE that performs communication through the PC5 interface may be located within a network coverage area or without network coverage. A network may be a 4G communication network, or may be a 5G communication network. This is not limited. A transmission distance of the PC5 interface communication may be 50 to 300 meters, and a latency requirement may be 100 ms (where a latency requirement in a collision scenario is 20 ms). The PC5 interface communication may include a unicast communication mode, a multicast communication mode, or a broadcast communication mode, that is, a unicast communication mode of the PC5 interface, a multicast communication mode of the PC5 interface, or a broadcast communication mode of the PC5 interface. This is not limited.

The unicast communication mode of the PC5 interface may be a communication mode in which a server sends service data to a single UE, that is, a transmission mode in which a destination address is a single target. Transmission may be performed between a V2X server and target UE in the unicast communication mode of the PC5 interface.

The multicast communication mode of the PC5 interface may be a communication mode in which a server sends service data to at least two UEs, that is, a transmission mode in which a destination address is the at least two UEs in a network. The at least two UEs described herein may be UEs in one area, the at least two UEs may be divided into a plurality of groups, and UEs in each group correspond to one address. Transmission may be performed, in the multicast communication mode of the PC5 interface, between a V2X server and UE in an area range including target UE.

The broadcast communication mode of the PC5 interface may be a communication mode in which a server sends service data to at least two UEs, that is, a transmission mode in which a destination address is the at least two UEs in a network. The at least two UEs described herein may be UEs in one area, and the at least two UEs correspond to one address. Transmission may be performed, in the broadcast communication mode of the PC5 interface, between a V2X server and UE in an area range including target UE.

The Uu interface may be for communication between UE and an access network device, and the communication may be referred to as Uu interface communication for short. The Uu interface communication may support long-distance transmission, and a latency requirement may be consistent with that of the PC5 interface communication, in other words, the latency requirement may also be 100 ms (where the latency requirement in the collision scenario is 20 ms). The Uu interface communication may include a unicast mode or a multicast communication mode, that is, a unicast communication mode of the Uu interface or a multicast communication mode of the Uu interface. This is not limited.

The unicast communication mode of the Uu interface may be a communication mode in which a server sends service data to a single UE, that is, a transmission mode in which a destination address is a single target. Transmission may be performed between a V2X server and target UE in the unicast communication mode of the Uu interface.

The multicast communication mode of the Uu interface may be a communication mode in which a server sends service data to at least two UEs, that is, a transmission mode in which a destination address is the at least two UEs in a network. The at least two UEs described herein may be UEs in one area, for example, a second area mentioned below, the at least two UEs may be divided into a plurality of groups, and UEs in each group correspond to one address. Transmission may be performed, in the multicast communication mode of the Uu interface, between a V2X server and UE in an area range including target UE.

A sending frequency basis of a V2X message defined in the 3GPP can support 10 Hz, and can support a maximum of 50 Hz. Calculation is performed based on an existing frequency, and when there is a large quantity of UEs, a V2X server sends a large volume of data. Resources are limited when the data is transmitted through the PC5 interface or the Uu interface. In this case, a large latency and a large packet loss exist when the V2X server sends the data. As a result, communication performance deteriorates.

For example, Beijing is used as an example, and it is assumed that a vehicle density in an urban area is 510 vehicles/km, and a population density is 8563 people/km². If a road mileage per square kilometer is 2 km, a vehicle in the urban area is converted into a vehicle device in a V2X device, and a pedestrian in the urban area is converted into a pedestrian device in the V2X device, a quantity of vehicle devices per square kilometer may be 1020, and a quantity of pedestrian devices per square kilometer may be 8563. A sum total is 9583 vehicles/km². It is assumed that a message concurrency frequency is 10 Hz (to be specific, 10 messages are sent per second), and each message occupies 1 KB (where for sensor data such as a video, each message is larger).

(1) In the unicast communication mode of the Uu interface, a quantity of uplink concurrent messages is 95,830 messages/second/km². Calculation is performed using an effective transmission range with a radius of 300 m, and a quantity of messages that need to be sent per second is (95830*0.3*0.3−1)*95830*0.3*0.3=74376825. It should be noted that this is only an average value. In a crowded situation (for example, around a shopping mall), more messages need to be sent per second.

(2) In the broadcast communication mode of the PC5 interface, a quantity of messages is 95830/second/km².

However, for the Uu interface: (1) Frequent message interaction poses a great challenge to concurrent processing of a network and a platform application server (AS); (2) there is a large volume of data, and a large quantity of repeated messages do not affect and change processing of a platform, but cause load on the network and vehicles, resulting in a large quantity of invalid messages; (3) there is a great challenge on a latency. For the PC5 interface communication, a maximum quantity of V2X devices supported within a range of the PC5 interface communication may be 100. However, a communication distance specified in the 3GPP is 300 meters. Spectrum resources cannot meet that tens of thousands of V2X devices simultaneously send messages. Moreover, in an actual test, the range of the PC5 interface communication is far longer than 300 meters.

For the foregoing problem, a solution is that the V2X server sends a determined risk area and risk data to the V2X device. However, risk identification accuracy in this manner is low. Even if the risk identification accuracy reaches 99.999%, it means that one message in 10,000 messages is incorrectly identified. This is a disaster for vehicles. In addition, in this implementation, a liability subject of an accident is transferred to the V2X server. To be specific, the V2X server sends the risk data to the V2X device only when determining that there is a risk. If a traffic accident is caused because the V2X server determines that there is no risk and does not send the risk area and the risk data, the V2X server is responsible for the accident.

For the foregoing problem, another solution is that the V2X device determines transmit power of a physical vehicle to everything shared channel (PVSCH) or a physical vehicle to everything control channel (PVCCH) using a power control parameter of the PVSCH or the PVCCH. Although V2X communication quality can be improved in this manner, the V2X device may not have a function of the Uu interface communication. Even if the V2X device has the function of the Uu interface communication, the PVSCH and the PVCCH need to be additionally added. The V2X device determines the transmit power based on the received power control parameter. Cases may be inconsistent for different V2X devices, and it is difficult for the V2X device to have global information, resulting in a large error.

This application provides a V2X communication method, to improve the V2X communication quality and further reduce power consumption of the V2X device (where UE is used as an example below). In addition, it can also be avoided that primary responsibility of the accident is transferred to the V2X server, and information received by the UE is determined using the global information, so that the error can be reduced.

Embodiments of this application may be applied to a 4G, 5G, or mobile edge computing (MEC) scenario, as shown in the following figure.

Figure 2A:
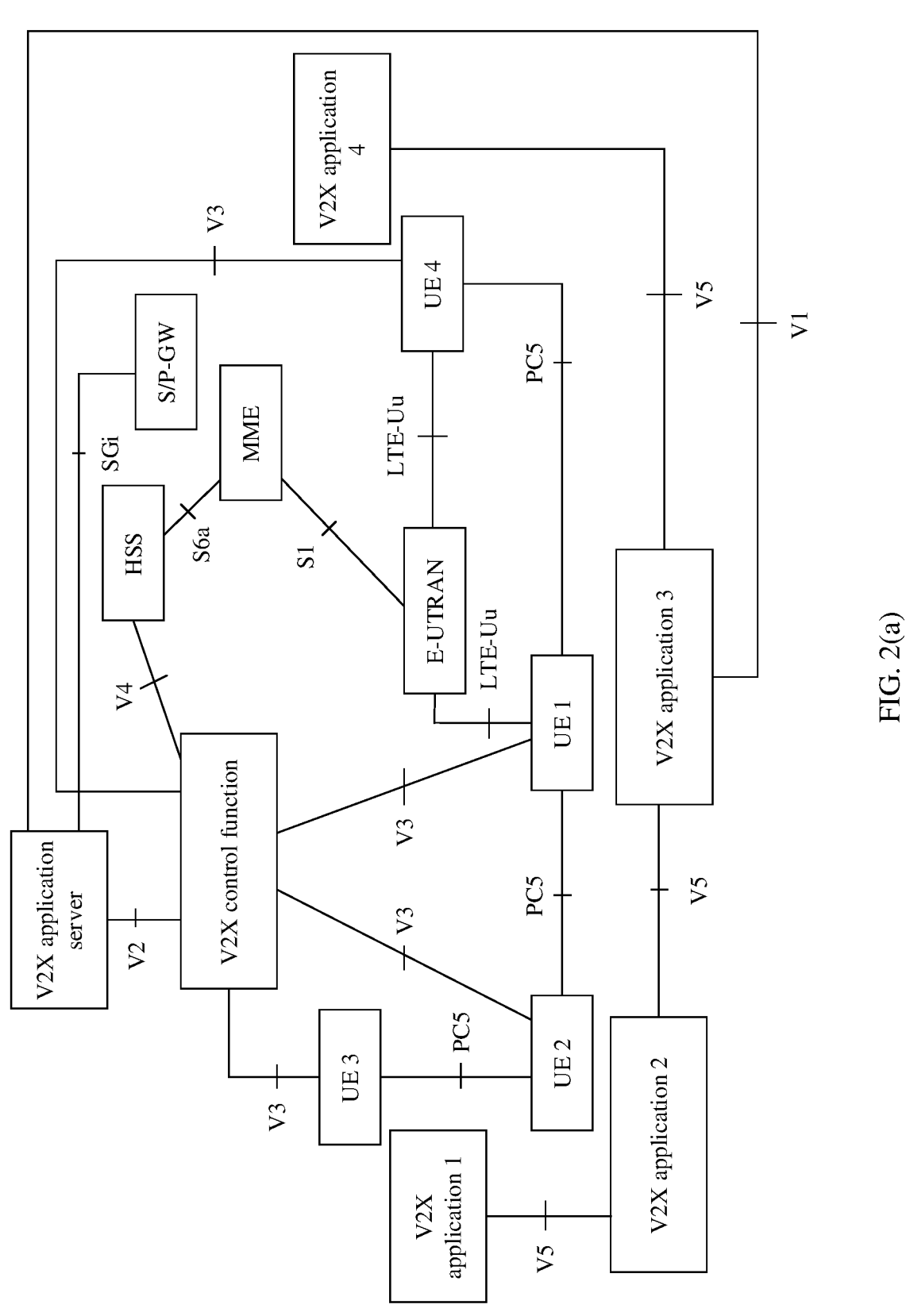
FIG. 2(a) to FIG. 2(e) each are example schematic diagrams based on a communication system.

FIG. 2(a) is a schematic diagram of a 4G-based V2X communication system. The communication system may include a V2X application server, a V2X application 1, a V2X application 2, a V2X application 3, a V2X application 4, a V2X control function, UE 1, UE 2, UE 3, UE 4, a home subscriber server (HSS), a mobility management entity (MME), an evolved UMTS terrestrial radio access network (E-UTRAN), and a serving/packet data network gateway (serving/PDN gateway, S/P-GW).

The V2X application server may communicate with a network element in a 4G or 5G network. For example, the V2X application server may communicate with the V2X control function, the UE, the S/P-GW, or the like. The V2X application server may be the foregoing V2X server.

A V2X application may be an application (for example, an application of UE) of the UE on V2X. For example, in FIG. 2(a), an application of the UE 3 on the V2X may be the V2X application 1, an application of the UE 2 on the V2X may be the V2X application 2, an application of the UE 1 on the V2X may be the V2X application 3, and an application of the UE 4 on the V2X may be the V2X application 4.

The V2X control function may be responsible for controlling a V2X policy parameter.

The HSS is a concept proposed when an internet protocol (IP) multimedia subsystem (IMS) is introduced into the 3GPP in R5, and may support a main user database of an IMS network entity configured to process a call/session. The HSS may include a user configuration file, perform user identity authentication and authorization, and provide information about a physical location of a user. Functions provided by the HSS include an IP multimedia function, a home location register (HLR) function necessary for a packet switch (PS) domain, and an HLR function necessary for a circuit switch (CS) domain.

The MME is a key control node of a 3GPP protocol long term evolution (LTE) access network, and may be responsible for positioning and a paging process of UE in an idle mode, including a relay. Simply speaking, the MME is responsible for signaling processing. The MME relates to a bearer activation/closure procedure and selects an S-GW for UE when the UE is initialized and connected to the MME. The MME authenticates the user by interacting with the HSS, and allocates a temporary identifier (ID) to the user. The MME also supports interception and monitoring in a scope allowed by law.

The E-UTRAN is a brand-new network system, and may provide a high transmission rate, to further meet a high speed requirement of a user.

The S-GW is a gateway terminated at an E-UTRAN interface. Main functions of the S-GW may include the following: During handover between eNBs, the S-GW may serve as a local anchor, and assist in completing a reordering function of the eNB. During handover between different access systems of the 3GPP, the S-GW serves as a mobility anchor, and also has the reordering function. The S-GW performs a lawful monitoring function, routes and forwards a data packet, and marks a packet on an uplink and downlink transport layer. In an idle mode, the S-GW performs downlink packet buffering, and initiates a service request triggered by a network. The S-GW is used for inter-operator charging, and so on.

The P-GW is a gateway that is oriented to a packet data network (PDN) and that is terminated at a super group interface (SGi). If UE accesses a plurality of PDNs, the UE corresponds to one or more P-GWs. Main functions of the P-GW may include a user-based packet filtering function, a user-based lawful monitoring function, a UE IP address allocation function, data packet transmission layer marking in an uplink/downlink, uplink/downlink service-level charging and service-level gating control, uplink/downlink rate control based on a service, and the like. In addition, the P-GW further provides an uplink/downlink bearer binding function and an uplink binding verification function.

Different applications may be connected through V5. For example, between the V2X application 1 and the V2X application 2, between the V2X application 2 and the V2X application 3, and between the V2X application 3 and the V2X application 4, V5 may be used for connection. The V2X application server may be connected to the V2X control function through V2. The V2X application server may be connected to the V2X application 3 through V1. The V2X control function may be separately connected to the UE 1, the UE 2, the UE 3, and the UE 4 through V3. The V2X control function may be connected to the HSS through V4. Different UEs may be connected through PC5. For example, between the UE 1 and the UE 2, between the UE 2 and the UE 3, and between the UE 1 and the UE 4, PC5 may be used for connection. The E-UTRAN may be connected to the UE through long term evolution-Uu (LTE-Uu). The E-UTRAN may be connected to the MME through S1. The HSS may be connected to the MME through S6a. The S/P-GW may be connected to the V2X control function through SGi.

Figure 2B:
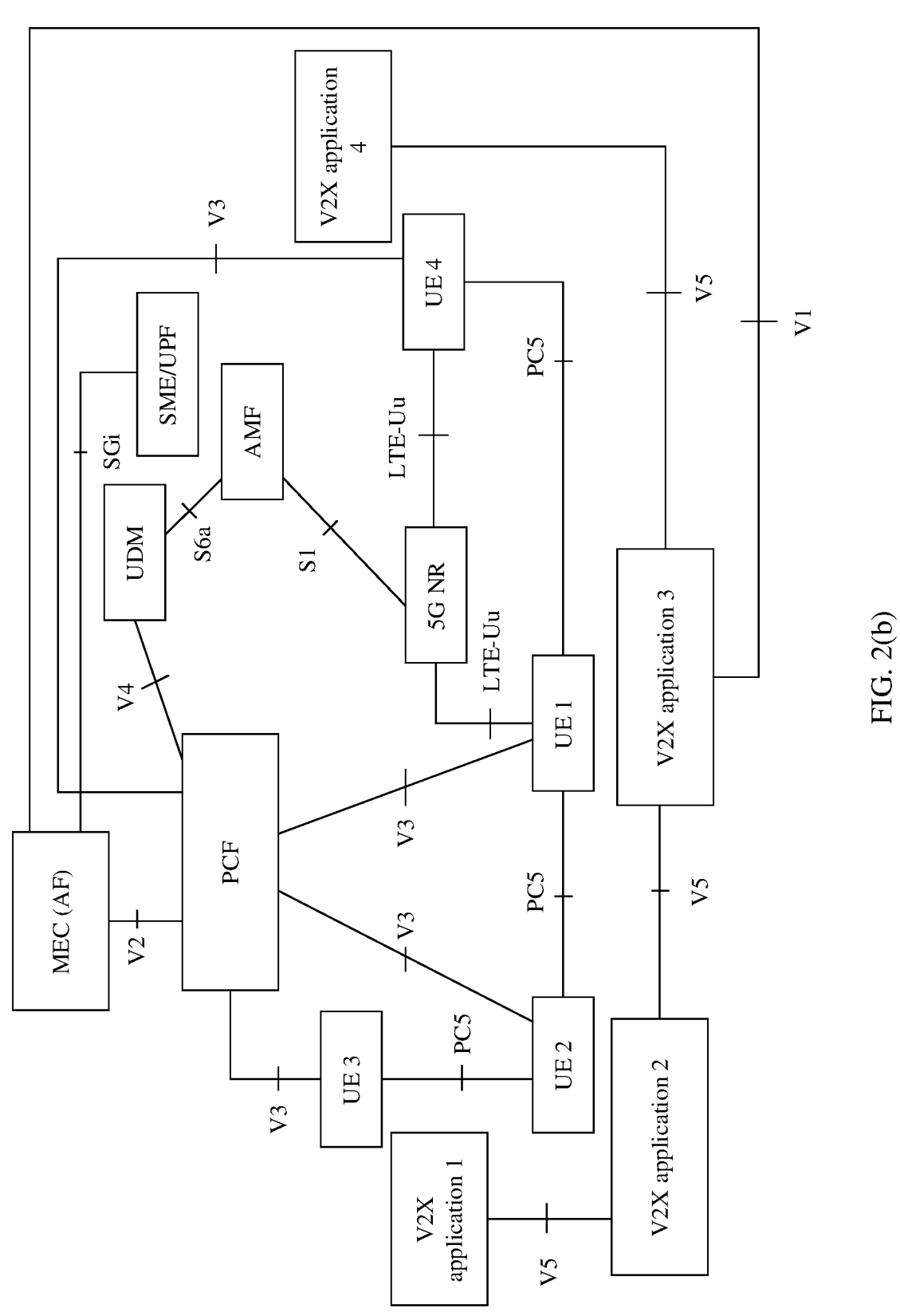

FIG. 2(b) is a schematic diagram of a 5G-based V2X communication system. The communication system may include a V2X application 1, a V2X application 2, a V2X application 3, a V2X application 4, a policy control function (PCF), UE 1, UE 2, UE 3, UE 4, MEC or an application function (AF), a unified data management (UDM), a mobility management network element (AMF), 5G new radio (5G NR), and a short message entity (SME)/user plane function (UPF).

The PCF may support a unified policy framework to manage network behavior, provide a policy rule for a network entity to implement execution, and access subscription information of a universal data repository (UDR). The PCF may access only a UDR of a same public land mobile network (PLMN) as the PCF.

As an edge cloud technology, biggest functions of the MEC are local computing and data processing. The MEC may use a flexible distributed network architecture to promote service capabilities and applications to a network edge. This greatly reduces waiting time and enables the MEC to match 5G.

Functions of the UDM mainly include: (1) generation of a 3GPP authentication certificate/authentication parameter; (2) storing and management of a permanent subscriber identifier of a 5G system; (3) management of subscription information; (4) delivery of a mobile terminate-short message service (MT-SMS) message; (5) short message service (SMS) message management; (6) registration management of a serving network element of a user (for example, an AMF that currently provides a service for a terminal).

The AMF is a termination point of a (radio) access network ((R)AN) signaling interface (N2) and a termination point of network attached server (NAS) (N1) signaling, is responsible for encryption and integrity protection of a NAS message, and is responsible for functions such as registration, access, mobility, authentication, and transparent transmission of a short message service message. In addition, the AMF is further responsible for EPS bearer identifier allocation when interacting with an evolved packet system (EPS) network.

The SME may usually refer to a mobile phone. The SME may receive or send a short message service message. The SME is located in a mobile base station, a fixed-line phone system (where a current fixed-line phone may also send a short message service message), or another service center.

Main functions of the UPF may be data packet routing and forwarding, and quality of service (QoS) flow mapping.

Similarly, different applications may be connected through V5. For example, between the V2X application 1 and the V2X application 2, between the V2X application 2 and the V2X application 3, and between the V2X application 3 and the V2X application 4, V5 may be used for connection. The MEC (AF) may be connected to the PCF through V2. The V2X application 3 may be connected to the MEC (AF) through V1. The PCF may be separately connected to the UE 1, the UE 2, the UE 3, and the UE 4 through V3. Different UEs may be connected through PC5. For example, between the UE 1 and the UE 2, between the UE 2 and the UE 3, and between the UE 1 and the UE 4, PC5 may be used for connection. 5G NR and the UE may be connected through LTE-Uu. 5G NR may be connected to the AMF through S1. The AMF may be connected to the UDM through S6a. The SME/UPF may be connected to the PCF through SGi.

Figure 2C:
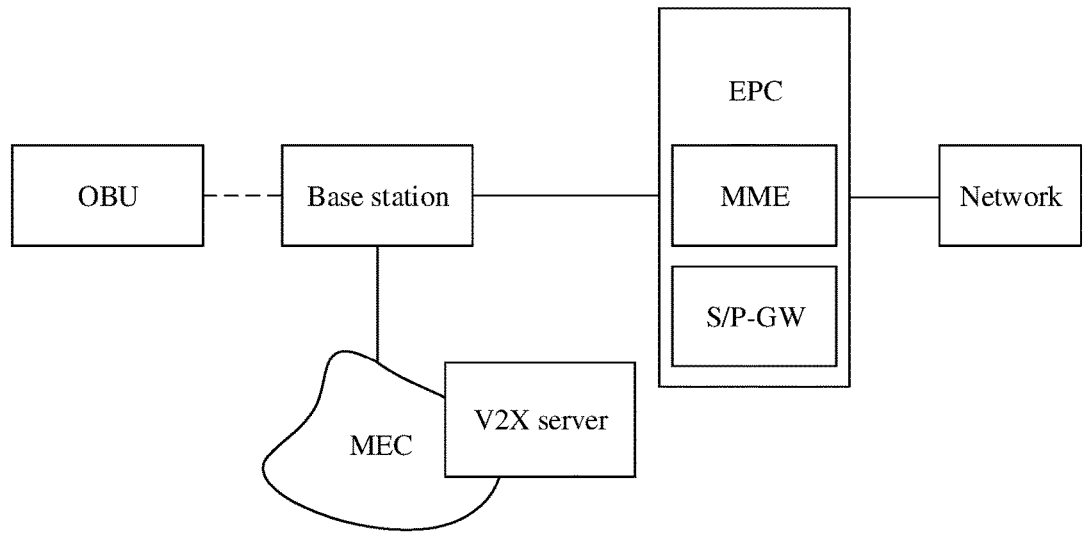

FIG. 2(c) is a schematic diagram of another 4G-based V2X communication system. The communication system may include an on board unit (OBU), a base station, an evolved packet core (EPC), and a network. The EPC may include an MME and an S/P-GW. It can be learned from FIG. 2(c) that a V2X server may be disposed at the base station, so that the V2X server can be directly connected to the OBU for communication.

Figure 2D:
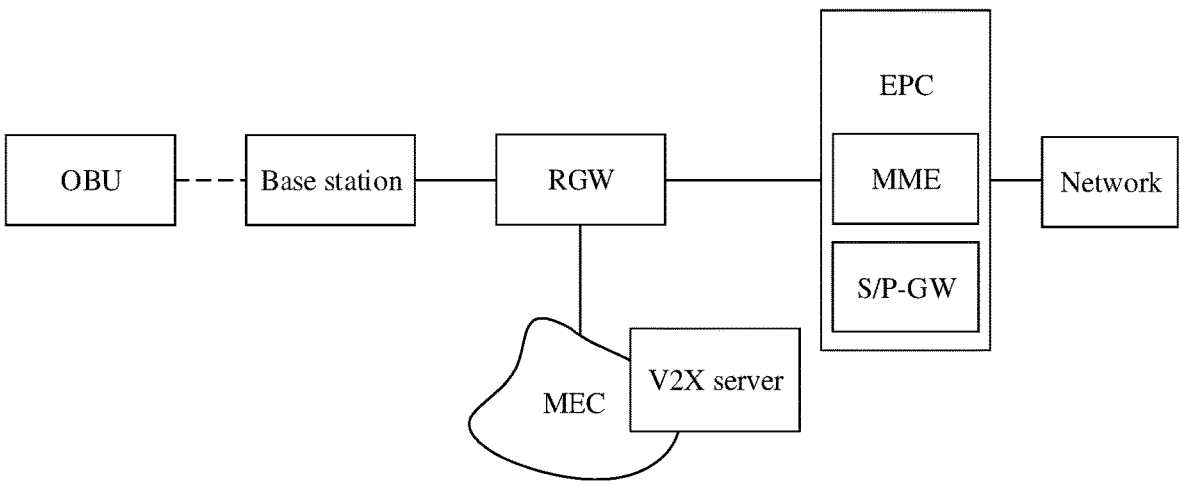

FIG. 2(d) is a schematic diagram of still another 4G-based V2X communication system. The communication system may include an OBU, a base station, a remote gateway (RGW), an EPC, and a network. The EPC may include an MME and an S/P-GW. It can be learned from FIG. 2(d) that a V2X server may be disposed at the RGW, so that the V2X server can communicate with the OBU through the base station.

Figures 2E, 3:
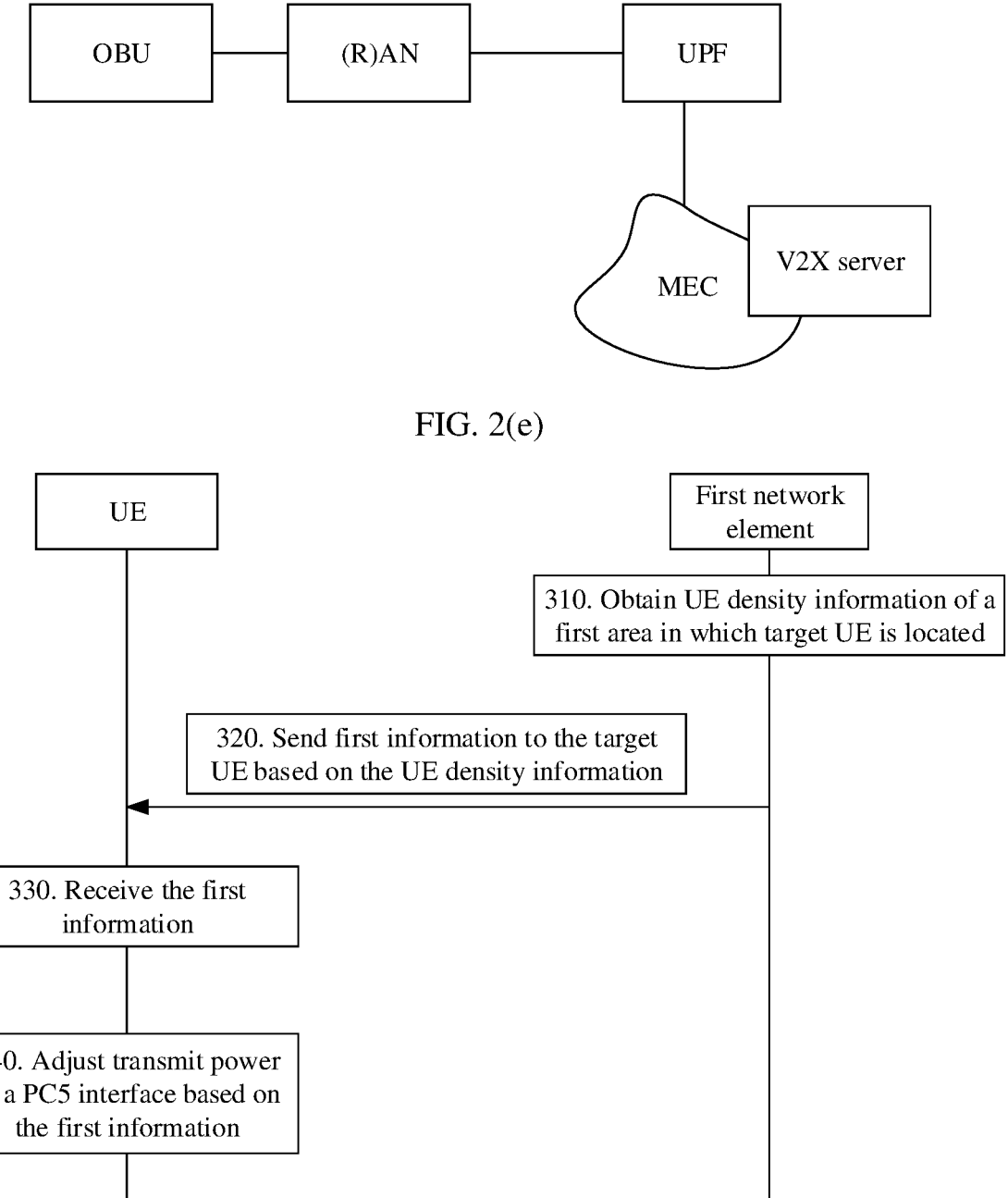
FIG. 3 is an example schematic diagram of a V2X communication method according to an embodiment of this application.

FIG. 2(e) is a schematic diagram of another 5G-based V2X communication system. The communication system may include UE, a (R)AN, and a UPF. A V2X server may be disposed at the UPF, so that the V2X server can communicate with the OBU through the (R)AN.

With reference to FIG. 3, the following describes in detail a V2X communication method 300 according to an embodiment of this application.

FIG. 3 shows a V2X communication method 300 according to an embodiment of this application. The method 300 may be based on the communication system in FIG. 2(a) or FIG. 2(b). Details are described as follows.

310. A first network element obtains UE density information of a first area in which target UE is located.

The first area may be an area centered on the target UE. A size of the area may be a circular area centered on the target UE and having a diameter of 1 km, or may be a circular area centered on the target UE and having a diameter of 100 m. Alternatively, the first area may be an area of a cell in which the target UE is located, that is, an area covered by a base station connected to the target UE. Alternatively, the first area may be an area that includes a plurality of crossroads or a plurality of roads and in which the target UE is located, for example, an area centered on the target UE and including 10 crossroads or 10 roads.

It should be understood that the first area in this embodiment of this application may be a circular area, may be a rectangular area or an elliptical area, or may be another irregular-shaped area or the like. This is not limited.

The target UE (which may also be referred to as a V2X client) may be a vehicle-mounted communication device, a handheld communication device (which may be referred to as a pedestrian device) of a pedestrian, or the like. This is not limited.

The first network element may be a V2X server, a PCF, or a V2X control function. This is not limited.

320. The first network element sends first information to the target UE based on the UE density information.

The first information may be used by the target UE to adjust transmit power of a PC5 interface.

Specifically, the first information may indicate a target value to which the target UE adjusts the transmit power of the PC5 interface, for example, 20 dB or 10 dB to which the transmit power is adjusted; or may indicate a margin by which the target UE adjusts the transmit power of the PC5 interface, for example, 10 dB by which the transmit power is increased.

According to the technical solution provided in this embodiment of this application, the first information is determined based on the UE density information of the first area in which the target UE is located, where the first information may be, for example, used by the target UE to adjust the transmit power of the PC5 interface. This can improve V2X communication quality, and further reduce power consumption of the target UE. In addition, because the first network element sends, to the target UE, the first information determined based on the UE density information of the first area in which the target UE is located, and the first area is an area including the target UE as a center, instead of a risk area around the target UE. Therefore, it can be avoided that primary responsibility of an accident is transferred to the V2X server. Moreover, the first information sent by the first network element to the target UE is determined using global information, in other words, determined using the UE density information of the first area in which the target UE is located, so that an error can be reduced.

330. The target UE receives the first information, where the first information is for adjusting the transmit power of the PC5 interface.

The first information in this embodiment of this application may include the transmit power of the PC5 interface of the target UE, for example, may include the transmit power of the PC5 interface of the target UE: 20 dB, 10 dB, or the like.

340. The target UE adjusts the transmit power of the PC5 interface based on the first information.

According to the technical solution provided in this embodiment of this application, the transmit power of the PC5 interface of the target UE is adjusted based on the received first information. This can improve V2X communication quality, and further reduce power consumption of the target UE. In addition, because the target UE receives the first information, where the first information is determined by the first network element based on the UE density information of the first area in which the target UE is located, and the first area is an area including the target UE as a center, instead of a risk area around the target UE. Therefore, it can be avoided that primary responsibility of an accident is transferred to a server. Moreover, the first information received by the target UE is determined by the first network element using global information, in other words, determined by the first network element using the UE density information of the first area in which the target UE is located, so that an error can be reduced.

It is pointed out above that the first information may be used by the target UE to adjust the transmit power of the PC5 interface. Content included in the first information in this embodiment of this application may be different. For specific content, refer to the following.

Optionally, in a first implementation scenario of the foregoing method, the first information includes target transmit power of the PC5 interface of the target UE.

The target transmit power in this embodiment of this application may be power determined by the first network element based on the obtained UE density information. For the target UE, the target transmit power may be used as reference information to adjust the transmit power of the PC5 interface.

For example, after obtaining the UE density information, the first network element may determine the first information based on the UE density information, where the first information may include the target transmit power of the PC5 interface of the target UE, and the first network element may send the target transmit power to the target UE. For example, the first information may include the target transmit power of the PC5 interface of the target UE: 20 dB, 10 dB, 60 dB, or the like. Further, the first network element may send the target transmit power to the target UE, so that the target UE adjusts the transmit power of the PC5 interface based on the received information.

From a perspective of UE, after receiving transmit power, the target UE may adjust the transmit power of the PC5 interface based on the received transmit power.

Optionally, with reference to the foregoing first implementation scenario, that the UE adjusts the transmit power of the PC5 interface based on the first information in step 340 includes:

when the target transmit power of the PC5 interface is less than or equal to maximum transmit power of the PC5 interface of the UE, the UE adjusts the transmit power of the PC5 interface to the target transmit power; or when the target transmit power of the PC5 interface is greater than maximum transmit power of the PC5 interface of the UE, the UE adjusts the transmit power of the PC5 interface to the maximum transmit power.

It should be noted that the first information may include the target transmit power of the PC5 interface of the target UE. It is assumed that the maximum transmit power of the PC5 interface is 50 dB. If the target transmit power that is of the PC5 interface of the target UE and that is included in the first information is 20 dB, the target UE may adjust the transmit power of the PC5 interface to 20 dB. If the transmit power that is of the PC5 interface of the target UE and that is included in the first information is 60 dB, the target UE may adjust the target transmit power of the PC5 interface to 50 dB.

It should be understood that the foregoing value is merely an example for description, may alternatively be another value, and should not be construed as a particular limitation on this application.

Based on the foregoing technical solution, the first information includes the target transmit power of the PC5 interface of the target UE, so that the UE can adjust the transmit power of the PC5 interface based on the received target transmit power, to improve the V2X communication quality.

Optionally, in a second implementation scenario of the foregoing method, if the UE density information is a UE density value, and the UE density value is greater than or equal to a preset threshold, the first information includes first indication information, where the first indication information indicates the target UE to decrease the transmit power of the PC5 interface; or if the UE density information is a UE density value, and the UE density value is less than a preset threshold, the first information includes first indication information, where the first indication information indicates the target UE to increase the transmit power of the PC5 interface.

The UE density value in this embodiment of this application may be a quantity of UEs included in the first area. The UE may include a vehicle-mounted communication device, a handheld communication device of a pedestrian, or the like. This is not limited.

In this embodiment of this application, the first indication information may indicate a transmit power decrease or a transmit power increase to the target UE, or may send an identifier corresponding to the transmit power decrease or the transmit power increase to the target UE. This is not specifically limited in this application.

For example, in an implementation, if the preset threshold in this embodiment of this application is 100, when the UE density value is 100, the transmit power of the PC5 interface of the target UE may be set to 35 dB. If the UE density value obtained by the first network element is 101 that is greater than the preset threshold 100, the first network element may send the transmit power decrease to the target UE. If the transmit power decrease is 20 dB, the first network element may send 20 dB to the target UE. If the UE density value obtained by the first network element is 1000 that is greater than the preset threshold 100, the first network element may send the transmit power decrease to the target UE. If the transmit power decrease is 25 dB, the first network element may send 25 dB to the target UE. If the UE density value obtained by the first network element is 50 that is less than the preset threshold 100, the first network element may send the transmit power increase to the target UE. If the transmit power increase is 15 dB, the first network element may send 15 dB to the target UE.

For example, in another implementation, the identifier corresponding to the transmit power decrease or the transmit power increase may alternatively be sent to the target UE. It is assumed that an identifier "0" indicates to increase the transmit power, and an identifier "1" indicates to decrease the transmit power. For example, if the obtained UE density value is 101 that is greater than the preset threshold 100, the identifier "1" corresponding to the transmit power decrease may be sent to the target UE. If the obtained UE density value is 50 that is less than the preset threshold 100, the identifier "0" corresponding to the transmit power increase may be sent to the target UE. The transmit power increase or the transmit power decrease may be determined by the target UE, or may be determined according to a rule negotiated by the first network element and the target UE.

For example, in still another implementation, a specific value of the transmit power increase or the transmit power decrease may alternatively be indicated by a corresponding identifier. It is assumed that identifiers "0a, 0b, 0c, and 0d" respectively indicate to increase the transmit power by 5 dB, 10 dB, 15 dB, 20 dB, and the like; and identifiers "1a, 1b, 1c, and 1d" respectively indicate to decrease the transmit power by 5 dB, 10 dB, 15 dB, 20 dB, and the like. If the UE density value obtained by the first network element is 101 that is greater than the preset threshold 100, the first network element may send the identifier corresponding to the transmit power decrease to the target UE. If the transmit power decrease is 20 dB, the first network element may send the identifier "1d" to the target UE. If the obtained UE density value is 50 that is less than the preset threshold 100, the first network element may send the identifier corresponding to the transmit power increase to the target UE. If the transmit power increase is 15 dB, the first network element may send the identifier "0c" to the target UE.

It should be understood that the foregoing value or identifier is merely an example for description, and may alternatively be another value or identifier. This is not limited.

From a perspective of UE, when receiving the first information, the target UE may adjust the transmit power of the PC5 interface based on the received transmit power increase or transmit power decrease.

Optionally, with reference to the foregoing second implementation scenario, that the UE adjusts the transmit power of the PC5 interface based on the first information in step 340 includes:

if the first information includes first indication information, and the first indication information indicates the UE to decrease the transmit power of the PC5 interface, the UE adjusts the transmit power of the PC5 interface with reference to current transmit power of the PC5 interface and a transmit power decrease indicated by the first indication information; or if the first information includes second indication information, and the second indication information indicates the UE to increase the transmit power of the PC5 interface, the UE adjusts the transmit power of the PC5 interface with reference to current transmit power of the PC5 interface, a transmit power increase indicated by the second indication information, and maximum transmit power of the PC5 interface.

It should be noted that, if the first indication information indicates a transmit power decrease or a transmit power increase of the PC5 interface, after receiving the first indication information, the target UE may adjust the transmit power of the PC5 interface with reference to the current transmit power of the PC5 interface and the maximum transmit power of the PC5 interface based on an indication of indication information.

For example, it is assumed that the current transmit power of the PC5 interface of the target UE is 30 dB. If the first indication information indicates that the transmit power decrease of the PC5 interface is 20 dB, the target UE may adjust the transmit power of the PC5 interface to 10 dB. If the first indication information indicates that the transmit power increase of the PC5 interface is 10 dB, and the maximum transmit power of the PC5 interface of the target UE is 50 dB, the target UE may adjust the transmit power of the PC5 interface to 40 dB. If the first indication information indicates that the transmit power increase is 30 dB, and the maximum transmit power of the PC5 interface of the target UE is 50 dB, the transmit power of the PC5 interface is 60 dB after being adjusted based on an indication of the first indication information, which is greater than the maximum transmit power of the PC5 interface. In this case, the target UE may adjust the transmit power of the PC5 interface to 50 dB.

Based on the foregoing technical solution, the first information includes indication information, where the indication information may indicate the target UE to increase or decrease the transmit power of the PC5 interface, so that the target UE can adjust the transmit power of the PC5 interface based on received transmit power, to improve the V2X communication quality.

In some implementations, the first indication information may alternatively indicate an identifier corresponding to the transmit power decrease or the transmit power increase of the PC5 interface. After receiving the first indication information, the UE may adjust the transmit power of the PC5 interface with reference to the current transmit power of the PC5 interface and the maximum transmit power of the PC5 interface based on the indication of the indication information.

For example, it is assumed that an identifier "0" indicates to increase the transmit power, and an identifier "1" indicates to decrease the transmit power. If the first indication information indicates the identifier "0", the target UE may increase the transmit power based on the current transmit power of the PC5 interface. The target UE may independently determine how much to increase, or may determine, according to a rule negotiated by the first network element and the target UE, how much to increase. If the first indication information indicates the identifier "1", the target UE may decrease the transmit power based on the current transmit power of the PC5 interface. The target UE may independently determine how much to decrease, or may determine, according to a rule negotiated by the first network element and the target UE, how much to decrease.

In some implementations, a specific value of the transmit power increase or the transmit power decrease may alternatively be indicated by a corresponding identifier. For example, it is assumed that identifiers "0a, 0b, 0c, and 0d" respectively indicate to increase the transmit power by 5 dB, 10 dB, 15 dB, 20 dB, and the like; and identifiers "1a, 1b, 1c, and 1d" respectively indicate to decrease the transmit power by 5 dB, 10 dB, 15 dB, 20 dB, and the like. If the first indication information indicates the identifier "0c", the target UE may increase the power by 15 dB based on the current transmit power of the PC5 interface. If the first indication information indicates the identifier "1d", the target UE may decrease the power by 20 dB based on the current transmit power of the PC5 interface.

Certainly, if transmit power after an increase based on the indication of the first indication information is greater than the maximum transmit power of the PC5 interface, the transmit power of the PC5 interface may be adjusted to the maximum transmit power.

It may be understood that the transmit power of the PC5 interface of the target UE is related to a transmission range. To be specific, larger transmit power indicates a larger transmission range, and smaller transmit power indicates a smaller transmission range. As described above, if the obtained UE density value is 101, it indicates that the UE density value is large at the moment, and the transmit power of the PC5 interface of the target UE may be decreased. If the target UE in this embodiment of this application is a vehicle, because what wants to be known in a running process of the vehicle is mainly a vehicle, a pedestrian, or the like near a target vehicle, when the UE density value is large, the transmit power of the PC5 interface of the target UE is decreased. In this way, the target vehicle can learn of a nearby road condition, and the transmit power of the target UE can be decreased. In other words, V2X communication quality can be improved, and power consumption of the UE can be reduced.

It should be noted that the first network element may obtain the UE density information through the following two implementations. One implementation may be that the first network element determines the UE density information based on location information of UE, and the other implementation may be that the first network element determines the UE density information based on a quantity of UEs. For specific content, refer to a fourth implementation scenario of the V2X communication method 300 and a fifth implementation scenario of the V2X communication method 300 below.

The foregoing provides descriptions that the UE density information may be the UE density value. In addition, the UE density information in this embodiment of this application may alternatively be a congestion rate, where the congestion rate may be indicated using a speed of UE, lane occupancy, or average passing time.

If the congestion rate is indicated using the speed of the UE, and it is assumed that the target UE is a vehicle, when a road is smooth, a speed of the target UE may reach 120 km/h. If a current speed of UE in the first area in which the target UE is located is less than 36 km/h, it may be considered that the road is congested. In this case, the first network element may send the first information to the target UE. The first information may include the first indication information, to indicate to decrease the transmit power of the PC5 interface. If the current speed of the UE in the first area in which the target UE is located is greater than or equal to 36 km/h, it may be considered that the road is smooth. In this case, the first network element may send the first information to the target UE. The first information may include the second indication information, to indicate to increase the transmit power of the PC5 interface.

If the congestion rate is indicated using the lane occupancy, and it is assumed that the target UE is a vehicle, when a road is smooth, a quantity of UEs in the first area per unit time is 100. If a quantity of UEs in the first area in which the target UE is located is 500, it may be considered that the road is congested. In this case, the first network element may send the first information to the target UE. The first information may include the first indication information, to indicate to decrease the transmit power of the PC5 interface. If the quantity of UEs in the first area in which the target UE is located is 50, it may be considered that the road is smooth. In this case, the first network element may send the first information to the target UE. The first information may include the second indication information, to indicate to increase the transmit power of the PC5 interface.

If the congestion rate is indicated using the average passing time, and it is assumed that the target UE is a vehicle, when a road is smooth, the average passing time is 3 seconds, to be specific, one vehicle passes every 3 seconds. If average passing time in the first area in which the target UE is located is 10 seconds, it may be considered that the road is congested. In this case, the first network element may send the first information to the target UE. The first information may include the first indication information, to indicate to decrease the transmit power of the PC5 interface. If the average passing time in the first area in which the target UE is located is 1 second, it may be considered that the road is smooth. In this case, the first network element may send the first information to the target UE. The first information may include the second indication information, to indicate to increase the transmit power of the PC5 interface.

It is pointed out above that the first network element may obtain the UE density information, and send the first information to the target UE based on the UE density information. The first network element may be a V2X server, a policy control function (PCF), or a V2X control function.

Correspondingly, the UE may receive the first information from the V2X server, the PCF, or the V2X control function.

It should be noted that when the first network element is the V2X server, the V2X server may send the first information to the target UE using the NEF, the V2X control function, or through a preset interface. The following separately provides descriptions with reference to an implementation 1 to an implementation 3.

Implementation 1: The V2X server sends the first information to the target UE using the NEF.

Figure 4:
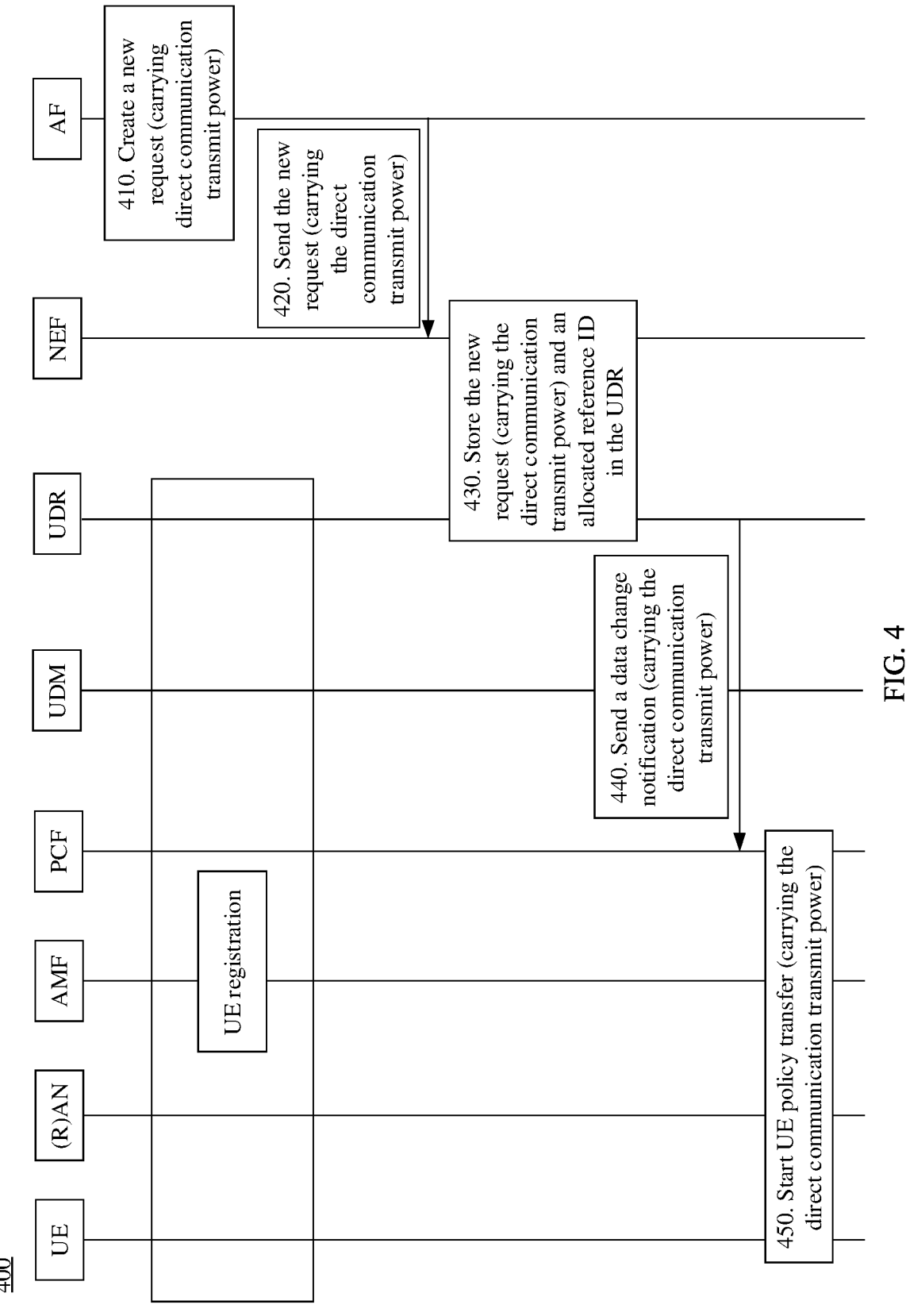
FIG. 4 is an example schematic diagram of a V2X communication method according to another embodiment of this application.

Specifically, refer to an embodiment shown in FIG. 4.

Implementation 2: The V2X server sends the first information to the target UE using the V2X control function.

Figure 5:
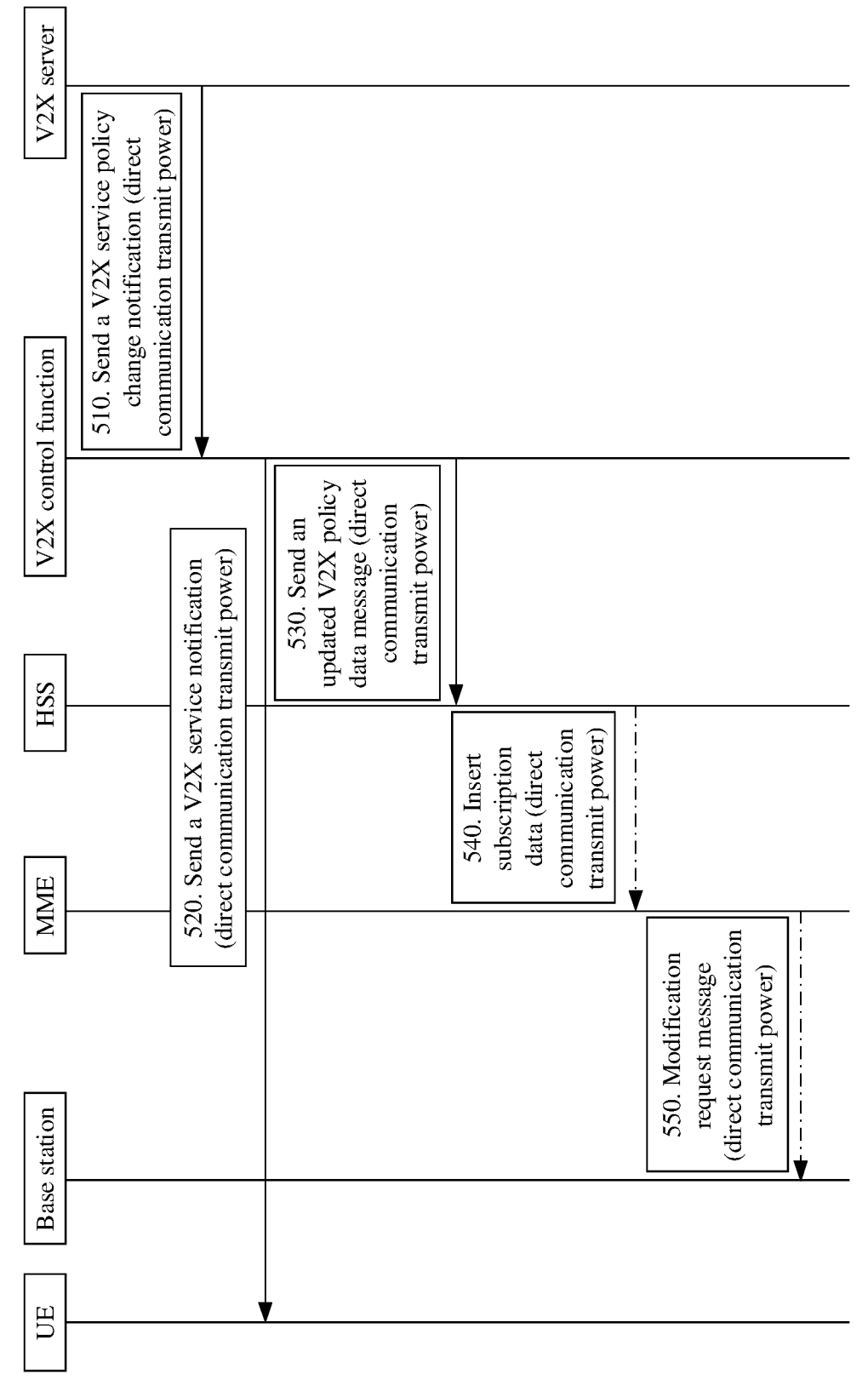
FIG. 5 is an example schematic diagram of a V2X communication method according to still another embodiment of this application.

Specifically, for Implementation 2, refer to steps 510 and 520 in an embodiment shown in FIG. 5.

Implementation 3: The V2X server sends the first information to the target UE through the preset interface.

Figure 6:
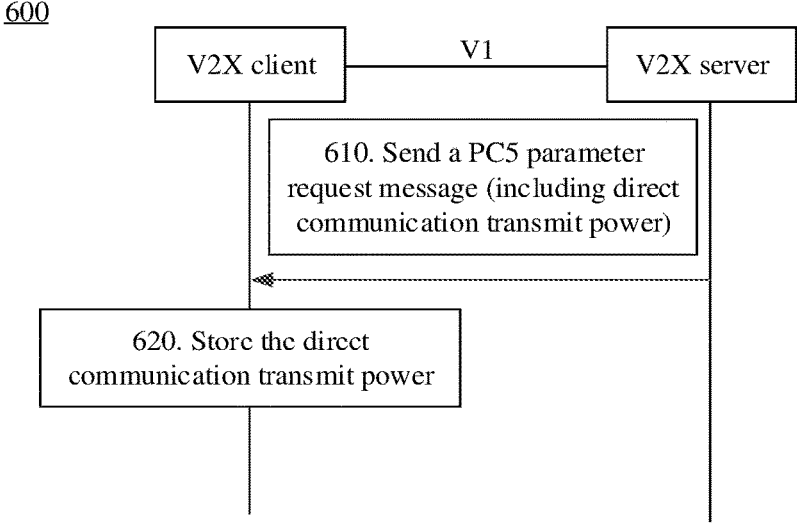
FIG. 6 is an example schematic diagram of a V2X communication method according to yet another embodiment of this application.

Specifically, refer to step 610 in an embodiment shown in FIG. 6.

When the first network element is the PCF, the PCF may send the first information to the target UE using some other network elements included in a core network. The following provides descriptions with reference to an implementation 4.

Implementation 4: The PCF sends the first information to the target UE using an AMF.

Figure 7:
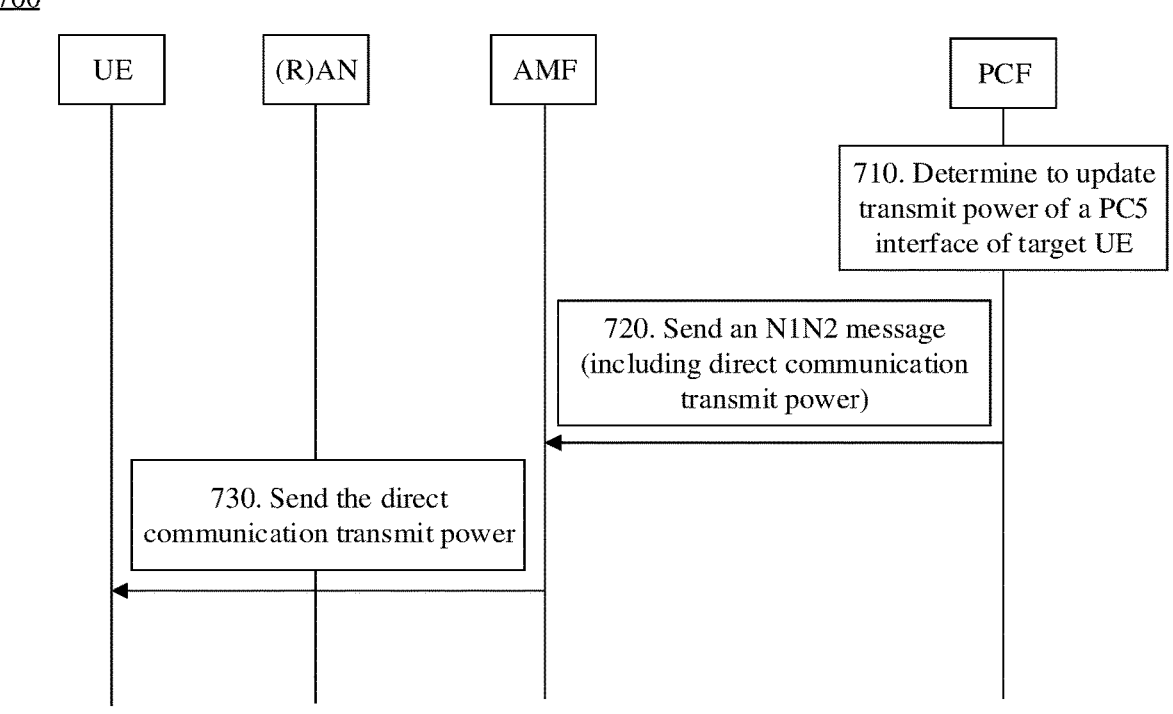
FIG. 7 is an example schematic diagram of a V2X communication method according to yet another embodiment of this application.

Specifically, refer to steps 710 to 730 in an embodiment shown in FIG. 7.

When the first network element is the V2X control function, the V2X control function may send the first information to the target UE using some other network elements included in a core network. The following provides descriptions with reference to an implementation 5.

Implementation 5: The V2X control function sends the first information to the target UE using an HSS.

Figure 8:
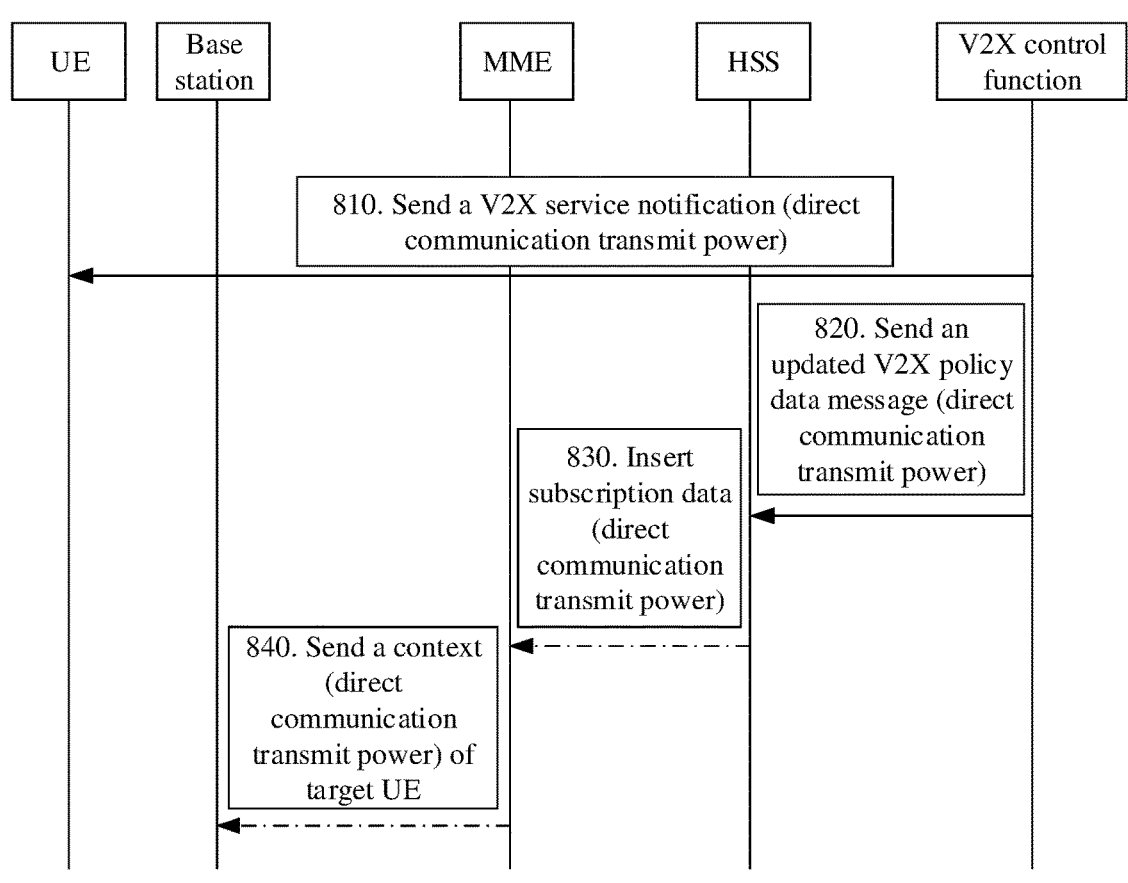
FIG. 8 is an example schematic diagram of a V2X communication method according to yet another embodiment of this application.

Specifically, refer to step 810 in an embodiment shown in FIG. 8.

The foregoing provides descriptions that the V2X server, the PCF, or the V2X control function may obtain the UE density information, and send, to the target UE based on the UE density information, the first information, where the first information may be, for example, for adjusting the transmit power of the PC5 interface. In some embodiments, if the first network element is the PCF or the V2X control function, the first network element may send transmit power to the target UE based on different transmit power. For details, refer to the following.

Optionally, in a third implementation scenario of the foregoing method, if the first network element is the PCF or the V2X control function, that the first network element sends first information to the target UE based on the UE density information in step 320 includes:

determining first transmit power of the PC5 interface of the target UE based on the UE density information; receiving second indication information from the V2X server, where the second indication information indicates second transmit power of the PC5 interface of the target UE; and sending the first information to the target UE based on the first transmit power and the second transmit power.

For example, if the first network element is the PCF, the PCF may determine the first transmit power based on the UE density information. In addition, the PCF may receive indication information that is determined by the V2X server and that indicates the second transmit power of the PC5 interface of the target UE. In this case, the PCF may determine target transmit power based on the received first transmit power and second transmit power, and send the target transmit power to the target UE.

Specifically, if the first transmit power determined by the PCF based on the UE density information is 20 dB, and the second indication information received by the PCF indicates that the second transmit power of the PC5 interface of the target UE is 25 dB, the PCF may determine the target transmit power based on the first transmit power and the second transmit power, for example, may determine that the target transmit power of the PC5 interface of the target UE is 20 dB, 25 dB, 23 dB, power of another value, or the like. This is not specifically limited in this application.

Similarly, if the first network element is the V2X control function, the V2X control function may also determine the first transmit power based on the UE density information. In addition, the V2X control function may also receive information that is determined by the V2X server and that indicates the second transmit power of the PC5 interface of the target UE. In this case, the V2X control function may determine target transmit power based on the received first transmit power and the received second transmit power, and send the target transmit power to the target UE.

Specifically, if the first transmit power determined by the V2X control function based on the UE density information is 20 dB, and the second indication information received by the V2X control function indicates that the second transmit power of the PC5 interface of the target UE is 25 dB, the V2X control function may determine the target transmit power based on the first transmit power and the second transmit power, for example, may determine that the target transmit power of the PC5 interface of the target UE is 20 dB, 25 dB, 23 dB, power of another value, or the like. This is not specifically limited in this application.

In some embodiments, the target UE may receive a plurality of pieces of first information, and each of the plurality of pieces of first information may be, for example, for adjusting transmit power of the PC5 interface. In this case, the target UE may determine, based on the received information, to adjust the target transmit power of the PC5 interface.

Optionally, with reference to the foregoing third implementation scenario, that the target UE adjusts the transmit power of the PC5 interface based on the first information in step 340 includes:

if receiving first information sent by the V2X server through a preset interface, and receiving first information sent by the PCF using an AMF, adjusting the transmit power of the PC5 interface of the target UE based on the first information received from the PCF.

In this embodiment of this application, the UE may receive the first information sent from the V2X server through the preset interface, or may receive the first information sent from the PCF using the AMF. In this case, the UE may adjust the target transmit power of the PC5 interface of the target UE based on content indicated by the first information received from the PCF.

For example, if the target UE receives the first information sent by the V2X server through a V1 interface, where the first information indicates that the transmit power of the PC5 interface of the target UE is 20 dB, and the target UE also receives the first information sent by the PCF, where the first information indicates that the transmit power of the PC5 interface of the target UE is 10 dB, the target UE may adjust the transmit power of the PC5 interface based on the first information received from the PCF, that is, may adjust the transmit power of the PC5 interface to 10 dB.

Optionally, with reference to the foregoing third implementation scenario, that the target UE adjusts the transmit power of the PC5 interface based on the first information in step 340 includes:

if receiving first information sent by the V2X server through a preset interface, and receiving first information sent by the V2X control function using an HSS, adjusting the transmit power of the PC5 interface of the target UE based on the first information received from the V2X control function.

Similarly, if the target UE receives the first information sent by the V2X server through a V1 interface, where the first information indicates that the transmit power of the PC5 interface of the target UE is 20 dB, and the target UE also receives the first information sent by the V2X control function, where the first information indicates that the transmit power of the PC5 interface of the target UE is 10 dB, the target UE may adjust the transmit power of the PC5 interface based on the first information received from the V2X control function, that is, may adjust the transmit power of the PC5 interface to 10 dB.

It should be understood that the foregoing value is merely an example for description, may alternatively be another value, and should not be construed as a particular limitation on this application.

It is pointed out above that the V2X server, the PCF, or the V2X control function may obtain the UE density information. The following describes in detail a process of obtaining the UE density information.

Optionally, in a fourth scenario of the foregoing method, that a first network element obtains UE density information of a first area in which target UE is located in step 310 includes:

receiving location information of at least one UE, where the at least one UE is located in the first area; and the first network element determines the UE density information based on the location information of the at least one UE.

The V2X server is used as an example for description. The V2X server may receive location information reported by at least one UE, and the at least one UE is located in the first area. For example, in this embodiment of this application, the first area includes 100 UEs, all the 100 UEs may report location information of the 100 UEs to the V2X server, and the V2X server may determine the UE density information based on the received information.

Specifically, it is assumed that the first area is a circular area centered on the target UE and having a diameter of 1 km, in other words, the V2X server needs to determine a quantity of UEs within 1 km around the target UE. The V2X server may determine, based on the received location information, the quantity of UEs within 1 km around the target UE. For example, if all the 100 UEs report the location information of the 100 UEs to the V2X server, and all the 100 UEs are located in the first area, the V2X server may determine that a UE density value is $100/km^2$, and may send the transmit power to the target UE based on the determined UE density information.

In this embodiment of this application, the first network element may receive the location information of the at least one UE, or may receive location information of at least one UE from a roadside device. This is not specifically limited in this application.

It should be understood that the first area in this embodiment of this application may alternatively be a circular area centered on the target UE and having a diameter of 100 m. If all 50 UEs report location information of the 50 UEs to the V2X server, and all the 50 UEs are located in the first area, the V2X server may determine that the UE density value is $50/100 \text{ m}^2$, to be specific, there may be 50 UEs per 100 square meters, and the V2X server may send the transmit power to the target UE based on the determined UE density value.

Based on the foregoing technical solution, because the UE density information is determined based on the location information of the at least one UE, in other words, the UE density information is determined using the global information, the error can be reduced.

It should be noted that, if the first network element is the PCF, a manner in which the PCF obtains the UE density information may include: locally generating the UE density information or obtaining the UE density information from another network element.

For example, the PCF may determine the UE density information based on obtained information such as locations or a quantity of UEs, in other words, may locally generate the UE density information, and thus may send target transmit power to the target UE based on the obtained UE density information; or may obtain the UE density information from a network data analytics function (NWDAF), and thus may send the target transmit power to the target UE based on the obtained UE density information.

Optionally, in a fifth scenario of the foregoing method, that a first network element obtains UE density information of a first area in which target UE is located in step 310 includes:

the first network element receives fourth indication information from a roadside device, where the fourth indication information indicates a quantity of UEs detected by the roadside device, and the detected UE is located in the first area; and the first network element determines the UE density information based on the quantity of the UEs.

The V2X server is used as an example for description. The V2X server may receive the fourth indication information reported by the roadside device, where the fourth indication information may indicate the quantity of the UEs detected by the roadside device. For example, the quantity of the UEs in the first area that are detected by the roadside device is 100. The V2X server determines the UE density information based on the received information.

Specifically, it is assumed that the first area is a circular area centered on the target UE and having a diameter of 1 km, in other words, the V2X server needs to determine a quantity of UEs within 1 km around the target UE. The V2X server may determine, based on the received information, the quantity of UEs within 1 km around the target UE. For example, if the quantity of UEs within 1 km around the target UE that are detected by the roadside device is 80, the V2X server may determine that the UE density information is $80/km^2$, and may send the transmit power to the target UE based on the determined UE density information.

In this embodiment of this application, the roadside device may be located in the first area, or may be located outside the first area. This embodiment of this application may be applied provided that UE detected by the roadside device is located in the first area. This is not specifically limited in this application.

It should be noted that, if the roadside device is located outside the first area, the roadside device may be located near the first area. In this way, the quantity of the UEs detected by the roadside device can be more valuable for the first network element to determine the UE density information. For example, it is assumed that the first area is a circular area centered on the target UE and having a diameter of 1 km, the roadside device may be located in an area having a diameter greater than 1 km, for example, may be located in an area having a diameter of 1.01 km.

Based on the foregoing technical solution, because the UE density information is determined based on the quantity of the UEs detected by the roadside device, in other words, the UE density information is determined using the global information, the error can be reduced.

It should be understood that the roadside device in this embodiment of this application may be a roadside sensor, for example, a camera, a radar, or a geomagnetic coil. The foregoing provides descriptions that the V2X server may determine the UE density information based on the obtained quantity of the UEs. In some embodiments, the V2X server may alternatively obtain vehicle flow density information and the like.

The geomagnetic coil is used as an example for description. The geomagnetic coil may send the vehicle flow density information (the UE density information) to the V2X server, and the V2X server may determine the transmit power of the PC5 interface after obtaining the UE density information.

Generally, each geomagnetic coil may have a managed area belonging to the geomagnetic coil, and the area managed by the geomagnetic coil may be preconfigured in the V2X server. Therefore, the V2X server may determine the transmit power of the PC5 interface based on information sent by the geomagnetic coil.

As described above, each geomagnetic coil may have the managed area belonging to the geomagnetic coil. If a first geomagnetic coil just manages the first area in this embodiment of this application, the V2X server may determine the transmit power of the PC5 interface based on UE density information reported by the first geomagnetic coil. If the first geomagnetic coil and a second geomagnetic coil jointly manage the first area in this embodiment of this application, the V2X server may determine the transmit power of the PC5 interface based on UE density information reported by the first geomagnetic coil and the second geomagnetic coil.

If the first geomagnetic coil and the second geomagnetic coil jointly manage the first area in this embodiment of this application, and it is assumed that the UE density information is a UE density value, a UE density value reported by the first geomagnetic coil is 80, and a UE density value reported by the second geomagnetic coil is 150, the V2X server may determine the transmit power of the PC5 interface based on the UE density value 150 reported by the second coil, or may determine the transmit power of the PCS interface based on an average value of the UE density values reported by the two geomagnetic coils, that is, based on (80+150)/2=115.

Certainly, the V2X server may alternatively determine the transmit power of the PC5 interface in another manner, for example, in a weighted mean value manner or a root mean square average value manner. This is not specifically limited in this application.

It should be noted that, if the first network element is the V2X control function, a manner in which the V2X control function obtains the UE density information may include: locally generating the UE density information or obtaining the UE density information from another network element.

For example, the V2X control function may determine the UE density information based on obtained information such as locations or a quantity of UEs, in other words, may locally generate the UE density information, and thus may send target transmit power to the target UE based on the obtained UE density information; or may obtain the UE density information from an NWDAF, and thus may send the target transmit power to the target UE based on the obtained UE density information.

FIG. 4 is a schematic diagram of a V2X communication method 400 according to an embodiment of this application. The target transmit power in the foregoing embodiment may be direct link transmit power (DL-TxPower) or a sidelink transmit power (SL-TxPower). The method 400 is described using an example in which the target transmit power is the SL-TxPower. Details are described as follows.

410. A V2X server creates a new request (including the SL-TxPower).

Specifically, the V2X server may invoke an "interface service parameter create (Nnef_ServiceParameter_Create)" service operation, to create the new request (including the SL-TxPower).

420. The V2X server sends the created new request (including the SL-TxPower) to a NEF.

430. The NEF stores the new request (including the SL-TxPower) in a UDR.

440. The UDR sends a data change notification (including the SL-TxPower) to a PCF.

450. The PCF sends the SL-TxPower to target UE.

For a specific process in which the PCF sends the SL-TxPower to the target UE, refer to a V2X communication method 700 below.

Alternatively, if a network includes a created request, a V2X server may update the created request.

Specifically, step 410 may be replaced with: The V2X server updates the created request (including the SL-Tx-Power).

Step 420 may be replaced with: The V2X server sends an updated created request (including the SL-TxPower) to a NEF.

Step 430 may be replaced with: The V2X server stores the updated created request (including the SL-TxPower) in a UDR.

Step 440 may still be: The UDR sends a data change notification (including the SL-TxPower) to a PCF.

Step 450 may still be: The PCF sends the SL-TxPower to target UE.

Further, the target UE may adjust the target transmit power of a PC5 interface based on the received SL-Tx-Power.

According to the technical solution provided in this embodiment of this application, the V2X server sends, to the target UE with reference to the network elements NEF, UDR, and PCF in a system, a power value for adjusting the transmit power of the PC5 interface, and controls the target transmit power of the PC5 interface of the target UE to control a communication range of the PC5 interface. This can improve V2X communication quality.

FIG. 5 is a schematic diagram of a V2X communication method 500 according to an embodiment of this application. The method 500 is described using an example in which target transmit power is SL-TxPower. Details are described as follows.

510. A V2X server sends a V2X service policy change notification message (including the SL-TxPower) to a V2X control function.

520. The V2X control function sends a V2X service notification (including the SL-TxPower) to target UE.

Further, the target UE may adjust the target transmit power of a PC5 interface based on the received SL-Tx-Power.

According to the technical solution provided in this embodiment of this application, the V2X server sends, to the target UE with reference to the network element V2X control function in a system, a power value for adjusting transmit power of the PC5 interface, and controls the target transmit power of the PC5 interface of the target UE to control a communication range of the PC5 interface. This can improve V2X communication quality, and further reduce power consumption of the target UE.

After the V2X control function sends the SL-TxPower to the target UE, to enable another network element in a network system to learn of the SL-TxPower of the target UE, the V2X control function may also send the SL-TxPower to the another network element, for example, an HSS, an MME, or a base station.

530. The V2X control function sends a V2X policy data message (including the SL-TxPower) to the HSS.

540. If a V2X direct communication service authorization includes a change of a PLMN with which the target UE registers, and a to-be-updated V2X direct communication service includes V2X direct communication discovery announcement or V2X direct communication, the HSS notifies the MME of the SL-TxPower by inserting a subscription data message.

For example, the change of the PLMN with which the target UE registers may be that the PLMN with which the target UE registers is removed from an allowed V2X direct communication discovery PLMN list.

The V2X direct communication service authorization is that a network allows at least one UE (including the target UE) to use a communication network. The communication network may include a plurality of PLMNs. When the PLMN with which the target UE registers changes, and parameters "V2X direct communication discovery announcement" and "V2X direct communication" included in the V2X direct communication service need to be updated, the HSS notifies the MME of the SL-TxPower by inserting the subscription data message.

550. If the base station sets up an S1 bearer with an S-GW, the MME sends a context (including the SL-TxPower) of the target UE to the base station using a modification request message.

Based on the foregoing solution, the V2X control function sends, to the base station with reference to the network element HSS in the system, the power value for adjusting the transmit power of the PC5 interface of the target UE, so that the base station can better control the target UE.

After determining the target transmit power of the PC5 interface of the target UE, the V2X server may send the target transmit power to the target UE through a preset interface, for example, through a V1 interface, so that the target UE can adjust the target transmit power of the PC5 interface based on the received target transmit power.

FIG. 6 is a schematic diagram of a V2X communication method 600 according to an embodiment of this application. The method 600 may be described using an example in which target transmit power of target UE is SL-TxPower. Details are described as follows.

610. A V2X server sends a PC5 parameter request message to a V2X client through a V1 interface.

The PC5 parameter request message carries the SL-TxPower. For example, PC5 parameter information carried in the PC5 parameter request message includes the SL-TxPower. The PC5 parameter information may further include traffic information and alarm information of a first area in which the target UE is located, location information of UE in the first area in which the target UE is located, and the like. The V2X client may be the target UE in the foregoing embodiments.

620. The V2X client stores the SL-TxPower.

Further, the V2X client may adjust target transmit power of a PC5 interface based on the SL-TxPower.

According to the technical solution provided in this embodiment of this application, the V2X server sends, through the V1 interface, a power value for adjusting the transmit power of the PC5 interface to the target UE, to control a communication range of the PC5 interface. This can improve V2X communication quality, and further reduce power consumption of the target UE. In addition, in this embodiment of this application, because the V2X server may directly control the target transmit power of the PC5 interface of the target UE through the V1 interface without a need to control the target transmit power of the PC5 interface using some network devices in a core network, compared with the foregoing V2X communication method 400 and V2X communication method 500, the solution provided in this embodiment of this application is simpler and more effective.

FIG. 7 is a schematic diagram of a V2X communication method 700 according to an embodiment of this application. The method 700 is described using an example in which target transmit power is SL-TxPower. Details are described as follows.

710. A PCF determines, based on UE density information, to update transmit power of a PC5 interface of target UE.

720. The PCF sends an N1N2 message (including the SL-TxPower) to an AMF.

For example, the PCF may invoke an "interface communication N1N2 message transfer (Namf_Communication_N1N2MessageTransfer)" service operation provided by the AMF, to send the N1N2 message.

The N1N2 message includes the SL-TxPower. For example, the SL-TxPower is carried in a UE policy container in the N1N2 message.

730. The AMF sends the SL-TxPower to the target UE.

For example, the AMF sends the UE policy container to the target UE, where the UE policy container includes the SL-TxPower.

Further, the target UE may adjust the target transmit power of the PC5 interface based on the received SL-TxPower.

According to the technical solution provided in this embodiment of this application, the PCF sends, to the target UE with reference to the network element AMF in a system, a power value for adjusting the transmit power of the PC5 interface, and controls the target transmit power of the PC5 interface of the target UE to control a communication range of the PC5 interface. This can improve V2X communication quality, and further reduce power consumption of the target UE.

FIG. 8 is a schematic diagram of a V2X communication method 800 according to an embodiment of this application. The method 800 is described using an example in which target transmit power is SL-TxPower. Details are described as follows.

810. A V2X control function sends a V2X service notification (including the SL-TxPower) to target UE.

Further, the target UE may adjust transmit power of a PC5 interface based on the received SL-TxPower.

According to the technical solution provided in this embodiment of this application, the V2X control function sends a power value for adjusting the transmit power of the PC5 interface to the target UE, and controls the target transmit power of the PC5 interface of the target UE to control a communication range of the PC5 interface. This can improve V2X communication quality, and further reduce power consumption of the target UE.

After the V2X control function sends the SL-TxPower to the target UE, to enable another network element in a network system to learn of the SL-TxPower of the target UE, the V2X control function may also send the SL-TxPower to the another network element, for example, an HSS, an MME, or a base station.

820. The V2X control function sends a V2X policy data message (including the SL-TxPower) to the HSS.

830. If a V2X direct communication service authorization includes a change of a PLMN with which the target UE registers, and a to-be-updated V2X direct communication service includes V2X direct communication discovery announcement or V2X direct communication, the HSS notifies the MME of the SL-TxPower by inserting a subscription data message.

For example, the change of the PLMN with which the target UE registers may be that the PLMN with which the target UE registers is removed from an allowed V2X direct communication discovery PLMN list.

The V2X direct communication service authorization is that a network allows at least one UE (including the target UE) to use a communication network. The communication network may include a plurality of PLMNs. When the PLMN with which the target UE registers changes, and parameters "V2X direct communication discovery announcement" and "V2X direct communication" included in the V2X direct communication service need to be updated, the HSS notifies the MME of the SL-TxPower by inserting the subscription data message.

Further, the MME updates and stores a context (including the SL-TxPower) of the target UE.

840. If the base station sets up an S1 bearer with an S-GW, the MME sends the context (including the SL-TxPower) of the target UE to the base station using a modification request message.

Based on the foregoing solution, the V2X control function sends, to the base station with reference to the network element HSS in a system, the power value for adjusting the transmit power of the PC5 interface of the target UE, so that the base station can better control the target UE.

The foregoing describes in detail that a first network element may send, to the target UE based on the UE density information, the power value for adjusting the transmit power of the PC5 interface, to improve the V2X communication quality. In some cases, the first network element may alternatively control a sending range of a V2X message through a Uu interface, to improve the V2X communication quality. For details, refer to the following.

Figure 9:
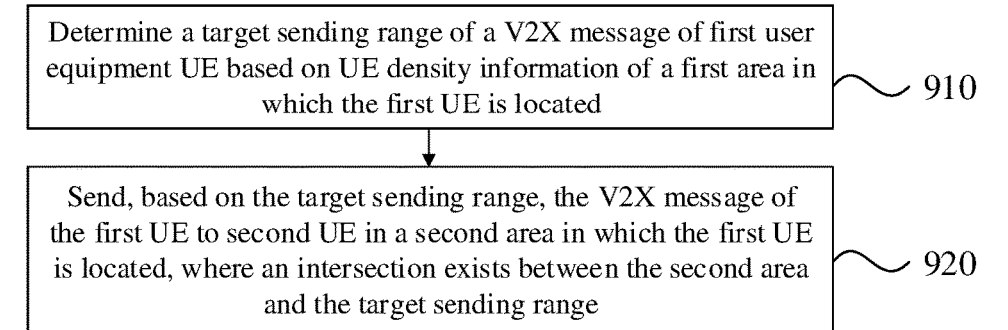
FIG. 9 is an example schematic diagram of a V2X communication method according to yet another embodiment of this application.

FIG. 9 shows a V2X communication method 900 according to an embodiment of this application. The method 900 may be performed by the V2X server in FIG. 2(*a*) or FIG. 2(*b*). Details are described as follows.

910. Determine a target sending range of a V2X message of first UE based on UE density information of a first area in which the first UE is located.

The first area may be an area centered on target UE. A size of the first area may be a circular area centered on the target UE and having a diameter of 1 km, or may be a circular area centered on the target UE and having a diameter of 100 m. Alternatively, the first area may be an area of a cell in which the target UE is located, that is, an area covered by a base station connected to the target UE. Alternatively, the first area may be an area that includes a plurality of crossroads or a plurality of roads and in which the target UE is located, for example, an area centered on the target UE and including 10 crossroads or 10 roads.

The first area in this embodiment of this application may be a circular area, may be a rectangular area or an elliptical area, or may be another irregular-shaped area or the like. This is not limited.

The first UE may be a vehicle-mounted communication device, a handheld communication device (which may be referred to as a pedestrian device) of a pedestrian, or the like. This is not limited.

920. Send, based on the target sending range, the V2X message of the first UE to second UE in a second area in which the first UE is located, where an intersection exists between the second area and the target sending range.

The second area may be the same as the first area, or may be different from the first area. The second area may include the first UE, or may not include the first UE.

Figures 10A, 10B:
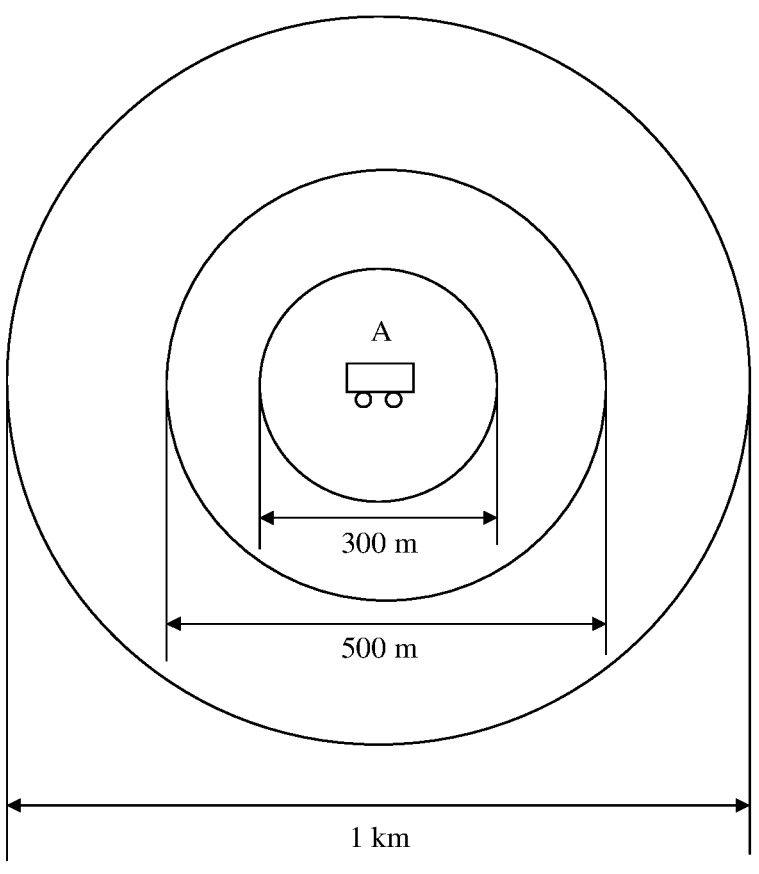
FIG. 10(a) and FIG. 10(b) are example schematic diagrams of different areas in which target UE is located according to an embodiment of this application.

Specifically, it is assumed that the first area is a circular area centered on the first UE and having a diameter of 1 km. If the first UE is located in a congested road section, for example, A shown in FIG. 10(*a*), the target sending range may be a circular area centered on the first UE and having a diameter of 500 m. Because the first UE is located in the congested road section and may not move in short time, the intersection area between the second area and the target sending range in this embodiment of this application may be a circular area centered on the first UE and having a diameter of 500 m, or may be a circular area centered on the first UE and having a diameter of 300 m.

If the first UE is located in a smooth road section, as shown in FIG. 10(*b*), and the target sending range is a circular area centered on the first UE and having a diameter of 500 m, because the first UE is located in the smooth road section, and may move by several meters or about a dozen meters in short time, that is, move from A to B in the figure, the intersection area between the second area and the target sending range in this embodiment of this application may be an area indicated by a black dashed line in the figure.

The V2X message in this embodiment of this application may include a location, a speed, an orientation, or the like of UE in the second area in which the first UE is located, and may further include accident information, traffic light information, other road condition information, or the like of the second area in which the target UE is located, this is not specifically limited in this application.

In this embodiment of this application, if the V2X server sends the V2X message of the first UE to the UE in the second area in a multicast communication mode through a Uu interface, the second area may include the first UE. If the V2X server sends the V2X message of the first UE to the UE in the second area in a unicast communication mode through a Uu interface, the second area may not include the first UE.

According to the technical solution provided in this embodiment of this application, the V2X server controls a sending range of the Uu interface to further control a communication range of the UE. This can reduce network resource load, to improve network performance Optionally, in a first scenario of the foregoing method, when the UE density information is a UE density value, and the UE density value is greater than or equal to a preset threshold, the target sending range is a range obtained by decreasing a historical sending range by a preset margin; or when the UE density information is a UE density value, and the UE density value is less than a preset threshold, the target sending range is a range obtained by increasing a historical target sending range by a preset margin, where the historical target sending range is a previous target sending range determined based on the V2X message of the first UE.

It should be noted that the historical target sending range in this embodiment of this application is the previous target sending range determined based on the V2X message of the first UE. For example, if a previous target sending range determined based on the UE density information is a range included in a circular area centered on the target UE and having a diameter of 500 m, a current target range may be adjusted and determined based on the range included in the circular area centered on the target UE and having the diameter of 500 m.

Specifically, it is assumed that, in this embodiment of this application, the preset threshold is 100, the historical sending range may be a range included in a circular area centered on the target UE and having a diameter of 500 m. If the UE density value obtained by the V2X server is 101, which is greater than the preset threshold 100, the V2X server may decrease the historical sending range, and may use a range included in a circular area centered on the first UE and having a diameter of 300 m as the target sending range. If the UE density value obtained by the V2X server is 50, which is less than the preset threshold 100, the V2X server may increase the historical sending range, and may use a range included in a circular area centered on the first UE and having a diameter of 800 m as the target sending range.

It may be understood that after determining the target sending range of the V2X message, the V2X server may send, based on the target sending range, the V2X message to the UE in the second area in which the first UE is located. Specifically, as described above, it is assumed that the UE density value obtained by the V2X server is 101, the V2X server may determine the range included in the circular area centered on the first UE and having the diameter of 300 m as the target sending range. In other words, the V2X server may send the V2X message of the first UE to the UE in the second area.

It should be understood that the foregoing value is merely an example for description, may alternatively be another value, and should not be construed as a particular limitation on this application.

Optionally, in a second scenario of the foregoing method, the method 900 may further include: receiving location information of at least one UE, where the at least one UE is located in the first area; and determining the UE density information based on the location information of the at least one UE.

In this embodiment of this application, the V2X server may receive location information reported by the at least one UE, and the at least one UE is located in the first area. For example, in this embodiment of this application, the first area includes 100 UEs, all the 100 UEs may report location information of the 100 UEs to the V2X server, and the V2X server may determine the UE density information based on the received information.

Specifically, it is assumed that the first area is a circular area centered on the target UE and having a diameter of 1 km, in other words, the V2X server needs to determine a quantity of UEs within 1 km around the target UE. The V2X server may determine, based on the received location information, the quantity of UEs within 1 km around the target UE. For example, if all the 100 UEs report the location information of the 100 UEs to the V2X server, and all the 100 UEs are located in the first area, the V2X server may determine that the UE density value is 100/km$^2$, and may send transmit power to the target UE based on the determined UE density information.

In this embodiment of this application, a first network element may receive the location information of the at least one UE from the UE, or may receive location information of at least one UE from a roadside device. This is not specifically limited in this application.

It should be understood that the first area in this embodiment of this application may alternatively be a circular area centered on the target UE and having a diameter of 100 m. If all 50 UEs report location information of the 50 UEs to the V2X server, and all the 50 UEs are located in the first area, the V2X server may determine that the UE density value is 50/100 m$^2$, to be specific, there may be 50 UEs per 100 square meters, and the V2X server may send the transmit power to the target UE based on the determined UE density value.

Optionally, in a third scenario of the foregoing method, the method 900 may further include: receiving fourth indication information reported by a roadside device, where the fourth indication information indicates a quantity of UEs detected by the roadside device, and the detected UE is located in the first area; and determining the UE density information based on the quantity of the UEs.

In this embodiment of this application, the V2X server may receive the fourth indication information reported by the roadside device, where the fourth indication information may indicate the quantity of the UEs detected by the roadside device. For example, the quantity of the UEs in the first area that are detected by the roadside device is 100. The V2X server may determine the UE density information based on the received information.

For example, it is assumed that the first area is a circular area centered on the target UE and having a diameter of 1 km, in other words, the V2X server needs to determine a quantity of UEs within 1 km around the target UE. The V2X server may determine, based on the received information, the quantity of UEs within 1 km around the target UE. For example, if the quantity of UEs within 1 km around the target UE that are detected by the roadside device is 80, the V2X server may determine that the UE density information is 80/km$^2$, and may send the transmit power to the target UE based on the determined UE density information.

In this embodiment of this application, the roadside device may be located in the first area, or may be located outside the first area. This embodiment of this application may be applied provided that UE detected by the roadside device is located in the first area. This is not specifically limited.

It should be noted that, if the roadside device is located outside the first area, the roadside device may be located near the first area. In this way, the quantity of UEs detected by the roadside device can be more valuable for the first network element to determine the UE density information. For example, it is assumed that the first area is a circular area centered on the target UE and having a diameter of 1 km, the roadside device may be located in an area having a diameter greater than 1 km, for example, may be located in a circular area having a diameter of 1.01 km.

It should be understood that the roadside device in this embodiment of this application may be a roadside sensor, for example, a camera, a radar, or a geomagnetic coil. The foregoing provides descriptions that the V2X server may determine the UE density information based on the obtained quantity of the UEs. In some embodiments, the V2X server may alternatively obtain vehicle flow density information and the like.

The geomagnetic coil is used as an example for description. The geomagnetic coil may send the vehicle flow density information (the UE density information) to the V2X server, and the V2X server may determine the sending range of the V2X message after obtaining the UE density information.

Generally, each geomagnetic coil may have a managed area belonging to the geomagnetic coil. If a first geomagnetic coil just manages the first area in this embodiment of this application, the V2X server may determine the sending range of the V2X message based on UE density information reported by the first geomagnetic coil. If the first geomagnetic coil and a second geomagnetic coil jointly manage the first area in this embodiment of this application, the V2X server may determine the sending range of the V2X message based on UE density information reported by the first geomagnetic coil and the second geomagnetic coil.

If the first geomagnetic coil and the second geomagnetic coil jointly manage the first area in this embodiment of this application, it is assumed that the UE density information is the UE density value, a UE density value reported by the first geomagnetic coil is 80, and a UE density value reported by the second geomagnetic coil is 150, the V2X server may determine the sending range of the V2X message based on the UE density value 150 reported by the second coil, or may determine the sending range of the V2X message based on an average value of the UE density values reported by the two geomagnetic coils, that is, based on (80+150)/2=115.

Certainly, the V2X server may alternatively determine the sending range of the V2X message in another manner, for example, in a weighted mean value manner or a root mean square average value manner. This is not specifically limited in this application.

The foregoing describes in detail the method embodiments of this application with reference to FIG. 1 to FIG. 10(a) and FIG. 10(b). The following describes apparatus embodiments of this application with reference to FIG. 11 and FIG. 15. The apparatus embodiments correspond to the method embodiments. Therefore, for a part that is not described in detail, refer to the method embodiments.

Figure 11:
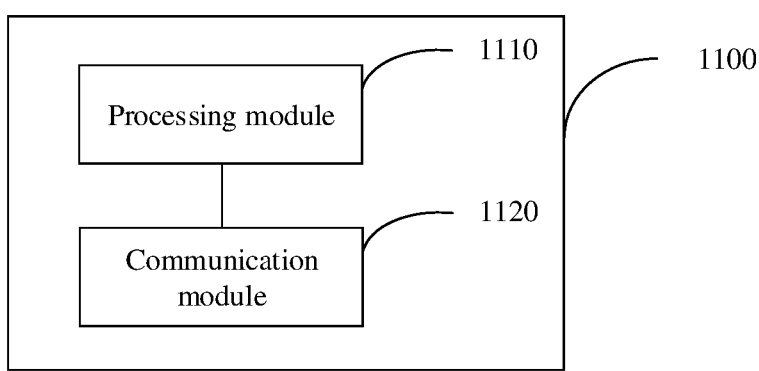
FIG. 11 is an example schematic diagram of a structure of a V2X communication apparatus according to an embodiment of this application.

FIG. 11 shows a V2X communication apparatus 1100 according to an embodiment of this application. The apparatus 1100 may include a processing module 1110 and a communication module 1120.

The processing module 1110 is configured to obtain UE density information of a first area in which target user equipment UE is located.

The communication module 1120 is configured to send first information to the target UE based on the UE density information, where the first information is used by the target UE to adjust transmit power of a proximity communication 5 PC5 interface.

Optionally, in some embodiments, the first information includes target transmit power of the PC5 interface of the target UE.

Optionally, in some embodiments, if the UE density information is a UE density value, and the UE density value is greater than or equal to a preset threshold, the first information includes first indication information, where the first indication information indicates the target UE to decrease the transmit power of the PC5 interface; or if the UE density information is a UE density value, and the UE density value is less than a preset threshold, the first information includes second indication information, where the second indication information indicates the target UE to increase the transmit power of the PC5 interface.

Optionally, in some embodiments, the processing module 1110 and/or the communication module 1120 are/is located in a V2X server, a PCF, or a V2X control function.

Optionally, in some embodiments, when a first network element is the PCF or the V2X control function, the processing module 1110 is further configured to determine first transmit power of the PC5 interface of the target UE based on the UE density information; and the communication module 1120 is further configured to: receive third indication information from the V2X server, where the third indication information indicates second transmit power of the PC5 interface of the target UE; and send the first information to the target UE based on the first transmit power and the second transmit power.

Optionally, in some embodiments, the communication module 1120 is further configured to receive location information of at least one UE, where the at least one UE is located in the first area; and the processing module 1110 is further configured to determine the UE density information based on the location information of the at least one UE.

Optionally, in some embodiments, the communication module 1120 is further configured to receive fourth indication information from a roadside device, where the fourth indication information indicates a quantity of UEs detected by the roadside device, and the detected UE is located in the first area; and the processing module 1110 is further configured to determine the UE density information based on the quantity of the UEs.

Figure 12:
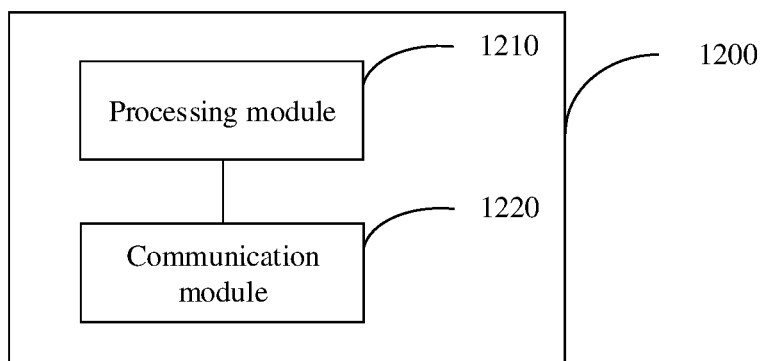
FIG. 12 is an example schematic diagram of a structure of a V2X communication apparatus according to another embodiment of this application.

FIG. 12 shows a V2X communication apparatus 1200 according to an embodiment of this application. The apparatus 1200 may include a processing module 1210 and a communication module 1220.

The processing module 1210 is configured to determine a target sending range of a V2X message of first user equipment UE based on UE density information of a first area in which the first UE is located.

The communication module 1220 is configured to send, based on the target sending range, the V2X message of the first UE to second UE in a second area in which the first UE is located, where an intersection exists between the second area and the target sending range.

Optionally, in some embodiments, when the UE density information is a UE density value, and the UE density value is greater than or equal to a preset threshold, the target sending range is a range obtained by decreasing a historical sending range by a preset margin; or when the UE density information is a UE density value, and the UE density value is less than a preset threshold, the target sending range is a range obtained by increasing a historical target sending range by a preset margin, where the historical target sending range is a previous target sending range determined based on the V2X message of the first UE.

Optionally, in some embodiments, the communication module 1220 is further configured to receive location information of at least one UE, where the at least one UE is located in the first area; and the processing module 1210 is further configured to determine the UE density information based on the location information of the at least one UE.

Optionally, in some embodiments, the communication module 1220 is further configured to receive fourth indication information reported by a roadside device, where the fourth indication information indicates a quantity of UEs detected by the roadside device, and the detected UE is located in the first area.

The processing module 1210 is further configured to determine the UE density information based on the quantity of the UEs.

Figure 13:
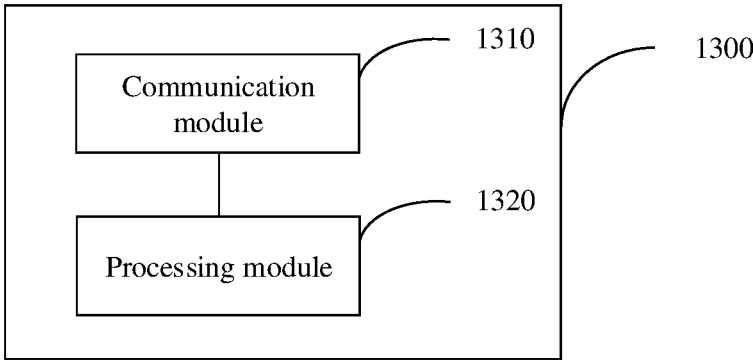
FIG. 13 is an example schematic diagram of a structure of a V2X communication apparatus according to still another embodiment of this application.

FIG. 13 shows a V2X communication apparatus 1300 according to an embodiment of this application. The apparatus 1300 may include a communication module 1310 and a processing module 1320.

The communication module 1310 is configured to receive first information, where the first information is for adjusting transmit power of a proximity communication 5 PC5 interface.

The processing module 1320 is configured to adjust the transmit power of the PC5 interface based on the first information.

Optionally, in some embodiments, the first information includes target transmit power of the PC5 interface of UE, and the processing module 1320 is further configured to: when the target transmit power of the PC5 interface is less than or equal to maximum transmit power of the PC5 interface of the UE, adjust the transmit power of the PC5 interface to the target transmit power; or when the target transmit power of the PC5 interface is greater than maximum transmit power of the PC5 interface of the UE, adjust the transmit power of the PC5 interface to the maximum transmit power.

Optionally, in some embodiments, the processing module 1320 is further configured to: if the first information includes first indication information, and the first indication information indicates the UE to decrease the transmit power of the PC5 interface, adjust the transmit power of the PC5 interface with reference to current transmit power of the PC5 interface and a transmit power decrease indicated by the first indication information; or if the first information includes second indication information, and the second indication information indicates the UE to increase the transmit power of the PC5 interface, adjust the transmit power of the PC5 interface with reference to current transmit power of the PC5 interface, a transmit power increase indicated by the second indication information, and the maximum transmit power of the PC5 interface.

Optionally, in some embodiments, the communication module 1310 is further configured to receive the first information from a V2X server, a policy control function PCF, or a V2X control function.

Figure 14:
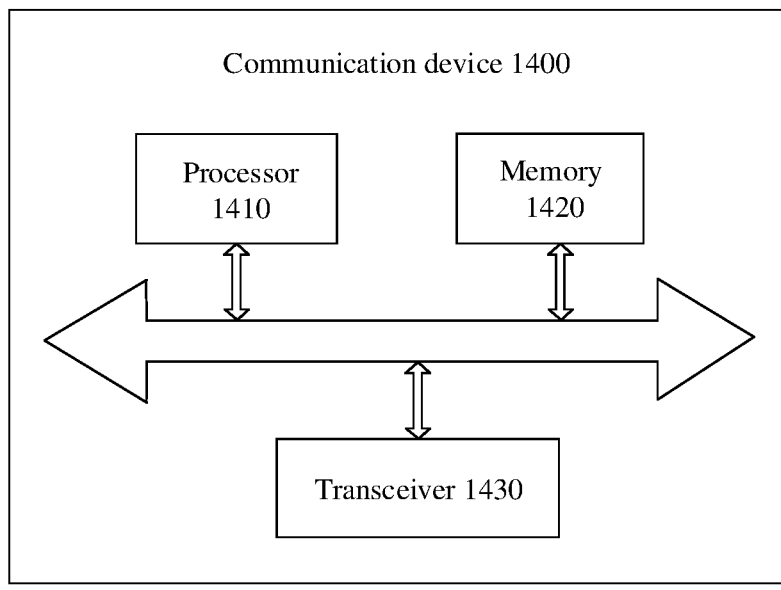
FIG. 14 is an example schematic diagram of a structure of a communication device according to an embodiment of this application.

An embodiment of this application further provides a communication device 1400. As shown in FIG. 14, the communication device 1400 includes a processor 1410 and a memory 1420. The memory is configured to store a computer program, and the processor is configured to invoke and run the computer program stored in the memory, to perform the method in embodiments of this application.

The processor 1410 may invoke the computer program from the memory 1420 and run the computer program, to implement the method in embodiments of this application.

The memory 1420 may be an independent device independent of the processor 1410, or may be integrated into the processor 1410.

Optionally, as shown in FIG. 14, the communication device 1400 may further include a transceiver 1430. The processor 1410 may control the transceiver 1430 to communicate with another device. Specifically, the processor 1410 may control the transceiver 1430 to send information or data to the another device, or receive information or data sent by the another device.

The transceiver 1430 may include a transmitter and a receiver. The transceiver 1430 may further include an antenna. There may be one or more antennas.

Optionally, the communication device 1400 may be the mobile terminal/terminal device in embodiments of this application, and the communication device 1400 may implement corresponding procedures implemented by the mobile terminal/terminal device in the methods in embodiments of this application.

Optionally, the communication device 1400 may be the V2X server, the PCF, or the V2X control function in embodiments of this application, and the communication device 1400 may implement corresponding procedures implemented by the V2X server, the PCF, or the V2X control function in the methods in embodiments of this application.

Figure 15:
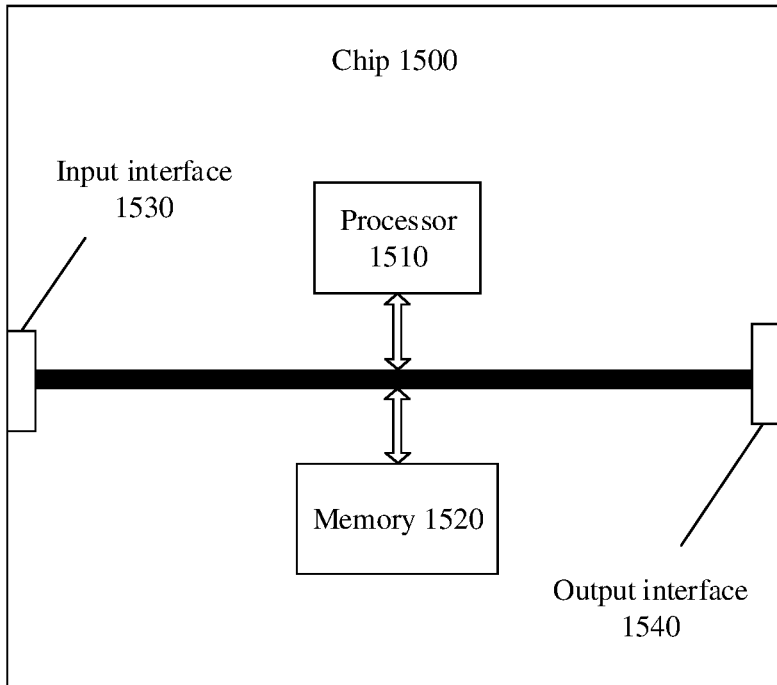
FIG. 15 is an example schematic diagram of a structure of a chip according to an embodiment of this application.

FIG. 15 is a schematic diagram of a structure of a chip according to an embodiment of this application. The chip 1500 shown in FIG. 15 includes a processor 1510. The processor 1510 may invoke a computer program from a memory and run the computer program, to implement the method in embodiments of this application.

Optionally, as shown in FIG. 15, the chip 1500 may further include a memory 1520. The processor 1510 may invoke a computer program from the memory 1520 and run the computer program, to implement the method in embodiments of this application.

The memory 1520 may be an independent device independent of the processor 1510, or may be integrated into the processor 1510.

Optionally, the chip 1500 may further include an input interface 1530. The processor 1510 may control the input interface 1530 to communicate with another device or chip. Specifically, the processor 1510 may control the input interface 1530 to obtain information or data sent by the another device or chip.

Optionally, the chip 1500 may further include an output interface 1540. The processor 1510 may control the output interface 1540 to communicate with another device or chip.

Specifically, the processor 1510 may control the output interface 1540 to output information or data to the another device or chip.

Optionally, the chip may be applied to the mobile terminal/terminal device in embodiments of this application, and the chip may implement corresponding procedures implemented by the mobile terminal/terminal device in the methods in embodiments of this application.

Optionally, the chip may be applied to the V2X server, the PCF, or the V2X control function in embodiments of this application, and the chip may implement corresponding procedures implemented by the V2X server, the PCF, or the V2X control function in the methods in embodiments of this application.

It should be understood that the chip in this embodiment of this application may also be referred to as a system-level chip, a system chip, a chip system, a system on chip, or the like.

It should be understood that the processor in this embodiment of this application may be an integrated circuit chip, and has a signal processing capability. In an implementation process, steps in the foregoing method embodiments may be implemented using a hardware integrated logical circuit in the processor or using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may further be any conventional processor, or the like. The steps in the methods disclosed with reference to embodiments of this application may be directly performed and completed by a hardware decoding processor, or may be performed and completed using a combination of hardware and software modules in a decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the methods described in this specification is intended to include, but not limited to, these memories and any memory of another proper type.

It should be understood that the memory is an example but not a limitation. For example, the memory in this embodiment of this application may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). In other words, the memory described in this embodiment of this application is intended to include, but not limited to, these memories and any memory of another proper type.

An embodiment of this application further provides a computer-readable storage medium, configured to store a computer program.

Optionally, the computer-readable storage medium may be applied to the mobile terminal/terminal device in embodiments of this application, and the computer program enables a computer to perform corresponding procedures implemented by the mobile terminal/terminal device in the methods in embodiments of this application.

Optionally, the computer-readable storage medium may be applied to the V2X server, the PCF, or the V2X control function in embodiments of this application, and the computer program enables a computer to perform corresponding procedures implemented by the V2X server, the PCF, or the V2X control function in the methods in embodiments of this application.

An embodiment of this application further provides a computer program product, including computer program instructions.

Optionally, the computer program product may be applied to the mobile terminal/terminal device in embodiments of this application, and the computer program instructions enable a computer to perform corresponding procedures implemented by the mobile terminal/terminal device in the methods in embodiments of this application.

Optionally, the computer program product may be applied to the V2X server, the PCF, or the V2X control function in embodiments of this application, and the computer program instructions enable a computer to perform corresponding procedures implemented by the V2X server, the PCF, or the V2X control function in the methods in embodiments of this application.

An embodiment of this application further provides a computer program.

Optionally, the computer program may be applied to the mobile terminal/terminal device in embodiments of this application, and when the computer program is run on a computer, the computer is enabled to perform corresponding procedures implemented by the mobile terminal/terminal device in the methods in embodiments of this application.

Optionally, the computer program may be applied to the V2X server, the PCF, or the V2X control function in embodiments of this application, and when the computer program is run on a computer, the computer is enabled to perform corresponding procedures implemented by the V2X server, the PCF, or the V2X control function in the methods in embodiments of this application.

A person of ordinary skill in the art may be aware that, with reference to the examples described in embodiments disclosed in this specification, units and algorithm steps may be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiment.

In several embodiments provided in this application, it should be understood that the disclosed system, apparatus, and method may be implemented in another manner. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium such as a USB flash drive, a removable hard disk, a ROM, a RAM, a magnetic disk, or an optical disc that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle to everything (V2X) communication method, comprising:
   obtaining, by a first network element, user equipment (UE) density information of a first area in which a target UE is located;

sending, by the first network element, first information to the target UE based on the UE density information of the first area, wherein the first information is used for the target UE to adjust transmit power of a proximity communication 5 (PC5) interface, the UE density information includes a UE density value, in association with the UE density value being greater than or equal to a threshold, the first information comprises first indication information instructing the target UE to decrease the transmit power of the PC5 interface, and in association with the UE density value being less than the threshold, the first information comprises second indication information instructing the target UE to increase the transmit power of the PC5 interface;

determining, by the first network element, a target sending range of a V2X message of a first UE based on UE density information of a third area in which the first UE is located; and sending, by the first network element based on the target sending range, the V2X message of the first UE to a second UE in a second area, wherein an intersection exists between the second area and the target sending range.

2. The method according to claim 1, wherein the first information comprises a target transmit power of the PC5 interface of the target UE.

3. The method according to claim 1, wherein the first network element is a V2X server, a policy control function (PCF), or a V2X control function.

4. The method according to claim 1, wherein the first network element is a policy control function (PCF) or a V2X control function, and sending, by the first network element, the first information to the target UE based on the UE density information comprises:

determining, by the first network element, a first transmit power of the PC5 interface of the target UE based on the UE density information;

receiving, by the first network element, third indication information from a V2X server, wherein the third indication information indicates a second transmit power of the PC5 interface of the target UE; and sending, by the first network element, the first information to the target UE based on the first transmit power and the second transmit power.

5. The method according to claim 1, wherein obtaining, by the first network element, the UE density information of the first area comprises:

receiving, by the first network element, location information of at least one UE, wherein the at least one UE is located in the first area; and determining, by the first network element, the UE density information based on the location information of the at least one UE.

6. The method according to claim 1, wherein obtaining, by the first network element, the UE density information of the first area comprises:

receiving, by the first network element, fourth indication information from a roadside device, wherein the fourth indication information indicates a quantity of UEs detected by the roadside device, and a detected UE is located in the first area; and determining, by the first network element, the UE density information based on the quantity of the UEs detected by the roadside device.

7. The method according to claim 1, wherein in association with the UE density value being greater than or equal to the threshold, the target sending range is obtained by decreasing a historical sending range by a specified margin; or in association with the UE density value being less than the threshold, the target sending range is obtained by increasing the historical target sending range by the specified margin, wherein the historical target sending range is a previous target sending range determined based on the V2X message of the first UE.

8. The method according to claim 1, further comprising:

receiving, by the first network element, location information of at least one UE, wherein the at least one UE is located in the third area; and determining, by the first network element, the UE density information based on the location information of the at least one UE.

9. The method according to claim 1, further comprising:

receiving, by the first network element, fourth indication information reported by a roadside device, wherein the fourth indication information indicates a quantity of UEs detected by the roadside device, and a detected UE is located in the third area; and determining, by the first network element, the UE density information based on the quantity of the UEs detected by the roadside device.

10. The method according to claim 1, wherein in association with the first network element being a V2X server, the V2X server is configured to send the first information using a network exposure function (NEF), a V2X control function, or a preset interface.

11. The method according to claim 1, wherein the first indication information instructs the target UE to adjust the transmit power of the PC5 interface with reference to a current transmit power of the PC5 interface and a transmit power decrease indicated by the first indication information, and the second indication information instructs the target UE to adjust the transmit power of the PC5 interface with reference to the current transmit power of the PC5 interface, a transmit power increase indicated by the second indication information, and a maximum transmit power of the PC5 interface.

12. A vehicle to everything (V2X) communication method, comprising:

receiving, by user equipment (UE), first information; and adjusting, by the UE, a transmit power of a proximity communication 5 (PC5) interface based on the first information, wherein adjusting, by the UE, the transmit power of the PC5 interface based on the first information comprises:

in association with the first information including first indication information, and the first indication information indicating the UE to decrease the transmit power of the PC5 interface, adjusting, by the UE, the transmit power of the PC5 interface with reference to a current transmit power of the PC5 interface and a transmit power decrease indicated by the first indication information; and in association with the first information including second indication information, and the second indication information indicating the UE to increase the transmit power of the PC5 interface, adjusting, by the UE, the transmit power of the PC5 interface with reference to the current transmit power of the PC5 interface, a transmit power increase indicated by the second indication information, and a maximum transmit power of the PC5 interface, wherein a target sending range of a V2X message of the UE is determined based on UE density information of a third area in which the UE is located, and the V2X message of the UE is sent, based on the target sending range, to another UE in a second area, wherein an intersection exists between the second area and the target sending range.

13. The method according to claim 12, wherein the first information comprises a target transmit power of the PC5 interface of the UE, and adjusting, by the UE, the transmit power of the PC5 interface based on the first information comprises:

in association with the target transmit power of the PC5 interface being less than or equal to a maximum transmit power of the PC5 interface of the UE, adjusting, by the UE, the transmit power of the PC5 interface to the target transmit power; or in association with the target transmit power of the PC5 interface being greater than the maximum transmit power of the PC5 interface of the UE, adjusting, by the UE, the transmit power of the PC5 interface to the maximum transmit power.

14. The method according to claim 12, wherein receiving, by the UE, the first information comprises:

receiving, by the UE, the first information from a V2X server, a policy control function (PCF), or a V2X control function.

15. A communication device, comprising:

at least one processor; and a memory configured to store computer readable instructions that, when executed by the at least one processor, cause the communication device to:

obtain user equipment (UE) density information of a first area in which a target UE is located;

send first information to the target UE based on the UE density information, wherein the first information is used for the target UE to adjust a transmit power of a proximity communication 5 (PC5) interface, the UE density information includes a UE density value, in association with the UE density value being greater than or equal to a threshold, the first information comprises first indication information instructing the target UE to decrease the transmit power of the PC5 interface, and in association with the UE density value being less than the threshold, the first information comprises second indication information instructing the target UE to increase the transmit power of the PC5 interface;

determine a target sending range of a V2X message of a first UE based on UE density information of a third area in which the first UE is located; and send, based on the target sending range, the V2X message of the first UE to a second UE in a second area, wherein an intersection exists between the second area and the target sending range.

16. The communication device according to claim 15, wherein the first indication information instructs the target UE to adjust the transmit power of the PC5 interface with reference to a current transmit power of the PC5 interface and a transmit power decrease indicated by the first indication information, and the second indication information instructs the target UE to adjust the transmit power of the PC5 interface with reference to the current transmit power of the PC5 interface, a transmit power increase indicated by the second indication information, and a maximum transmit power of the PC5 interface.

17. A communication device, comprising:

at least one processor; and a memory configured to store computer readable instructions that, when executed by the at least one processor, cause the communication device to:

receive first information; and adjust a transmit power of a proximity communication 5 (PC5) interface based on the first information, wherein adjusting the transmit power of the PC5 interface based on the first information comprises:

in association with the first information including first indication information, and the first indication information indicating the communication device to decrease the transmit power of the PC5 interface, adjusting the transmit power of the PC5 interface with reference to a current transmit power of the PC5 interface and a transmit power decrease indicated by the first indication information; and in association with the first information including second indication information, and the second indication information indicating the communication device to increase the transmit power of the PC5 interface, adjusting the transmit power of the PC5 interface with reference to the current transmit power of the PC5 interface, a transmit power increase indicated by the second indication information, and a maximum transmit power of the PC5 interface, wherein a target sending range of a V2X message of the UE is determined based on UE density information of a third area in which the UE is located, and the V2X message of the UE is sent, based on the target sending range, to another UE in a second area, wherein an intersection exists between the second area and the target sending range.

18. The communication device according to claim 17, wherein the first information comprises a target transmit power of the PC5 interface, and the communication device is further caused to:

in association with the target transmit power of the PC5 interface being less than or equal to a maximum transmit power of the PC5 interface, adjust the transmit power of the PC5 interface to the target transmit power; or in association with the target transmit power of the PC5 interface being greater than the maximum transmit power of the PC5 interface, adjust the transmit power of the PC5 interface to the maximum transmit power.

* * * * *